(12) United States Patent
Nagai et al.

(10) Patent No.: US 9,209,459 B2
(45) Date of Patent: Dec. 8, 2015

(54) SECONDARY BATTERY

(75) Inventors: Hiroki Nagai, Nagoya (JP); Masahiro Morita, Toyota (JP); Takashi Iwao, Kodoma (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 267 days.

(21) Appl. No.: 13/879,042

(22) PCT Filed: Oct. 15, 2010

(86) PCT No.: PCT/JP2010/068210
§ 371 (c)(1),
(2), (4) Date: Apr. 12, 2013

(87) PCT Pub. No.: WO2012/049777
PCT Pub. Date: Apr. 19, 2012

(65) Prior Publication Data
US 2013/0209879 A1   Aug. 15, 2013

(51) Int. Cl.
*H01M 4/485* (2010.01)
*H01M 4/131* (2010.01)
*H01M 4/505* (2010.01)
*H01M 4/525* (2010.01)

(52) U.S. Cl.
CPC .............. *H01M 4/485* (2013.01); *H01M 4/131* (2013.01); *H01M 4/505* (2013.01); *H01M 4/525* (2013.01); *Y02E 60/122* (2013.01)

(58) Field of Classification Search
CPC .............................. H01M 4/13; H01M 10/052
USPC .......... 429/231.95, 223, 231.3, 312, 102, 211; 423/594.3, 594.4
See application file for complete search history.

(56) References Cited

U.S. PATENT DOCUMENTS

| 5,677,082 A * | 10/1997 | Greinke et al. ............... 429/312 |
| 2010/0068610 A1 * | 3/2010 | Sudworth ..................... 429/102 |
| 2012/0282525 A1 | 11/2012 | Nagai et al. |

FOREIGN PATENT DOCUMENTS

| JP | 10-255763 | 9/1998 |
| JP | 10-321227 | 12/1998 |

(Continued)

OTHER PUBLICATIONS

English Translation of JP2005-044722 (Feb. 2005).*

*Primary Examiner* — Patrick Ryan
*Assistant Examiner* — Kiran Quraishi
(74) *Attorney, Agent, or Firm* — Finnegan, Henderson, Farabow, Garrett & Dunner, LLP

(57) ABSTRACT

A secondary battery 100 includes a positive electrode current collector 221 and a positive electrode mixture layer 223 which is coated over the positive electrode current collector 221. The positive electrode mixture layer 223 includes a positive electrode active material 610, an electrically conductive material 620, and a binder 630. In addition, the positive electrode active material 610 has secondary particles 910 formed by an aggregation of a plurality of primary particles of a lithium transition metal oxide, a hollow portion 920 formed in the secondary particle 910, and through holes 930 penetrating the secondary particles 910 so as to connect the hollow portion 920 and the outside. A ratio (Vbc/Va) of an inner volume Vbc of holes formed inside the positive electrode mixture layer 223 to an apparent volume Va of the positive electrode mixture layer 223 satisfies $0.25 \leq (Vbc/Va)$. In addition, in a section of the positive electrode mixture layer 223, a ratio (Vb/Vc) of an inner volume Vb of holes B formed inside the positive electrode active material 610 to an inner volume Vc of holes C formed outside the positive electrode active material 610 satisfies $0.05 \leq (Vb/Vc) \leq 2.5$.

13 Claims, 11 Drawing Sheets

(56) References Cited

FOREIGN PATENT DOCUMENTS

| JP | 2002-75365 | | 3/2002 | | |
| JP | 2002-203603 | | 7/2002 | | |
| JP | 2005-044722 | * | 2/2005 | ............ | H01M 4/58 |
| JP | 2005-158623 | | 6/2005 | | |
| JP | 2011-119092 | | 6/2011 | | |

* cited by examiner

SECONDARY BATTERY

CROSS-REFERENCE TO RELATED APPLICATIONS

This application is a national phase application of International Application No. PCT/JP2010/068210, filed Oct. 15, 2010, the content of which is incorporated herein by reference.

TECHNICAL FIELD

The present invention relates to a secondary battery. In the present specification, "secondary battery" is a term which describes repetitively chargeable storage devices in general and which encompasses so-called storage batteries such as a lithium-ion secondary battery, a nickel hydride battery, and a nickel-cadmium battery as well as storage elements such as an electrical double layer capacitor.

In addition, in the present specification, the term "lithium-ion secondary battery" encompasses secondary batteries which use lithium ions as electrolyte ions and in which charging and discharging are realized by the movement of electrons accompanying lithium ions between a positive electrode and a negative electrode.

BACKGROUND ART

Examples of disclosed literature related to lithium-ion secondary batteries include Patent Literature 1 to 5 below.

Patent Literature 1 discloses an invention related to a non-aqueous electrolyte solution secondary battery. The non-aqueous electrolyte solution secondary battery disclosed in Patent Literature 1 is structured such that a positive electrode forming a positive electrode mixture layer and a negative electrode are immersed in a non-aqueous electrolyte solution. The positive electrode mixture layer contains a lithium transition metal complex oxide, an electrically conductive material mainly formed of a graphite carbon material, and a binder. The positive electrode mixture layer is approximately uniformly applied to a positive electrode current collector. In addition, a lithium transition metal complex oxide with a layered crystalline structure and an average particle diameter of 5 to 20 μm is used as the lithium transition metal complex oxide. Patent Literature 1 discloses that a proportion of a volume of holes in the positive electrode mixture layer among a volume of the positive electrode mixture layer is 25% or higher and 35% or lower. Patent Literature 1 also discloses that, due to the structure described above, an amount of the non-aqueous electrolyte solution in the positive electrode mixture layer is optimized, a distribution of the non-aqueous electrolyte solution becomes approximately uniform, and diffusivity of lithium ions and electron conductivity are secured.

In addition, a non-aqueous electrolyte solution secondary battery disclosed in Patent Literature 2 is structured such that a positive electrode layer including a lithium complex metal oxide containing nickel and a vinylidene fluoride-based fluoro-rubber is supported by a current collector. Patent Literature 2 discloses that, as measured by a mercury intrusion method, the positive electrode layer has a porosity of 20% to 50% and a pore volume of 10 mm$^3$/g to 150 mm$^3$/g with respect to pores in a diameter range of 0.1 μm to 3 μm.

Furthermore, a non-aqueous electrolyte secondary battery disclosed in Patent Literature 3 comprises a positive electrode bearing an active material made of a spinel lithium manganese complex oxide. Furthermore, a BET specific surface area of the positive electrode active material is 1.5 m$^2$/g or less, an average particle diameter of primary particles ranges from 0.5 μm to 5 μm, an average particle diameter of secondary particles ranges from μm to 30 μm, and a porosity of the positive electrode ranges from 15% to 40%.

Moreover, Patent Literature 4 discloses a gel electrolyte battery comprising a positive electrode, a negative electrode, a non-aqueous electrolyte solution containing an electrolyte salt, and a gel electrolyte made of matrix macromolecules. The gel electrolyte battery disclosed in Patent Literature 4 comprises a positive electrode mixture layer containing a positive electrode active material. In addition, a porosity of the positive electrode mixture layer with respect to hole diameters of 0.6 μm or more is within a range of 18% or higher and 34% or lower.

In addition, Patent Literature 5 discloses a positive electrode active material of a lithium secondary battery having a crystalline structure made of a spinel manganese complex oxide. In this case, the manganese complex oxide is expressed by the chemical formula $Li_{1-x}Mn_{1-x-y}M_yO_4$ (where $0 \leq x \leq 0.4$, $0 \leq y \leq 0.15$, and M in the formula denotes at least one or more types of metal selected from a group consisting of Ni, Co, Cr, and Al). The positive electrode active material disclosed in Patent Literature 5 has holes formed inside particles. In addition, an amount of the holes inside the particles is set so that a ratio of a cross-sectional area of the holes inside a particle to a cross-sectional area of the particle ranges from 3.0% to 20%.

CITATION LIST

Patent Literature

Patent Literature 1: Japanese Patent Application Laid-open No. 2005-158623
Patent Literature 2: Japanese Patent Application Laid-open No. H10-255763
Patent Literature 3: Japanese Patent Application Laid-open No. H10-321227
Patent Literature 4: Japanese Patent Application Laid-open No. 2002-203603
Patent Literature 5: Japanese Patent Application Laid-open No. 2002-75365

SUMMARY OF INVENTION

As described above, prior art exist which cite porosity of a positive electrode mixture layer or an amount of holes formed inside particles of a positive electrode active material as an index for evaluating performance of a secondary battery. However, there are cases where the performance of a secondary battery cannot be evaluated by simply evaluating a proportion of holes inside a positive electrode mixture layer to a volume of the positive electrode mixture layer or evaluating a ratio of a cross-sectional area of holes inside a particle to a cross-sectional area of the particle. In particular, the present invention is associated with a novel structure of a positive electrode active material which is capable of improving the performance of a secondary battery. The present invention proposes a novel structure of a secondary battery capable of improving the performance of the secondary battery when the positive electrode active material with the novel structure is used.

A secondary battery according to the present invention comprises a current collector and a positive electrode mixture layer which coats the current collector. The positive electrode mixture layer includes a positive electrode active material, an electrically conductive material, and a binder. In addition, the positive electrode active material has secondary particles formed by an aggregation of a plurality of primary particles of a lithium transition metal oxide, a hollow portion formed in the secondary particles, and through holes penetrating the secondary particles so as to connect the hollow portion and the outside. A ratio (Vbc/Va) of an inner volume Vbc of holes formed inside the positive electrode mixture layer to an apparent volume Va of the positive electrode mixture layer satisfies 0.25≤(Vbc/Va). In addition, among the positive electrode mixture layer, a ratio (Vb/Vc) of an inner volume Vb of holes B formed inside the positive electrode active material to an inner volume Vc of holes C formed outside the positive electrode active material satisfies 0.05≤(Vb/Vc)≤2.5.

According to the secondary battery described above, collecting capability of the positive electrode mixture layer improves and so-called high-rate characteristics or cycle characteristics can be further improved. The ratio (Vbc/Va) described above may satisfy 0.30≤(Vbc/Va). In addition, the ratio (Vbc/Va) may satisfy (Vbc/Va)≤0.60. For example, the ratio (Vbc/Va) may satisfy (Vbc/Va)≤0.57. Furthermore, the ratio (Vb/Vc) may satisfy 0.07≤(Vb/Vc). In addition, the ratio (Vb/Vc) may satisfy (Vb/Vc)≤1.95.

Moreover, a method of producing the positive electrode active material may comprise a raw material hydroxide formation step, a mixing step, and a calcining step. In this case, the raw material hydroxide formation step is a step of supplying ammonium ions to an aqueous solution of a transition metal compound and precipitating particles of a transition metal hydroxide from the aqueous solution. The aqueous solution contains at least one transition metal element that composes the lithium transition metal oxide. In addition, the raw material hydroxide formation step includes: a nucleation stage in which a transition metal hydroxide is precipitated from the aqueous solution at pH 12 or higher and at an ammonium ion concentration of 25 g/L or lower; and a particle growth stage in which the precipitated transition metal hydroxide is grown at a pH of less than 12 and at an ammonium ion concentration of 3 g/L or higher. Furthermore, the mixing step is a step of mixing the transition metal hydroxide with a lithium compound to prepare an unfired mixture. The calcining step is a step of calcining the mixture to obtain the active material particles.

In addition, the calcining step may be performed so that a maximum calcining temperature is 800° C. or higher and 1100° C. or lower. Furthermore, the calcining step may include a first calcining stage in which the mixture is fired at a temperature T1 of 700° C. or higher and 900° C. or lower and a second calcining stage in which the result of the first calcining stage is fired at a temperature T2 of 800° C. or higher and 1100° C. or lower which is higher than the calcining temperature T1 of the first calcining stage.

In addition, a BET specific surface area of the positive electrode active material may be 0.5 $m^2$/g or more and 1.9 $m^2$/g or less. Furthermore, an average particle diameter of the positive electrode active material may range from 3 μm to 10 μm. In addition, for example, the positive electrode active material is a lithium transition metal oxide which has a layered structure and which contains nickel as a constituent element. Alternatively, for example, the positive electrode active material is a lithium transition metal oxide which has a layered structure and which contains nickel, cobalt, and manganese as constituent elements.

DESCRIPTION OF EMBODIMENTS

Figure 1:
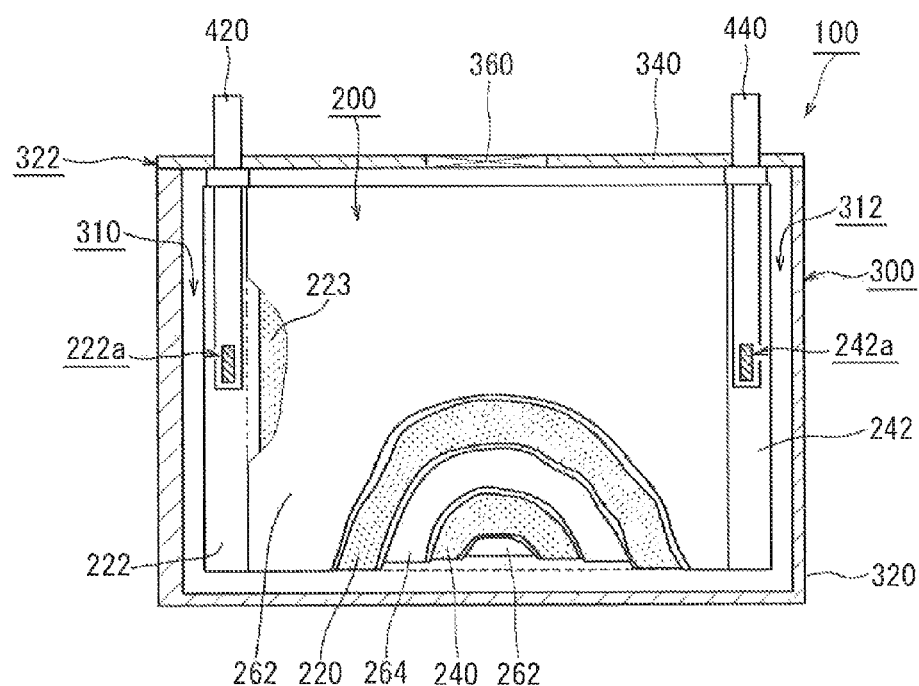
FIG. 1 is a diagram showing an example of a structure of a lithium-ion secondary battery.

Hereinafter, a secondary battery according to an embodiment of the present invention will be described with reference to the drawings. Members and portions that produce same effects are denoted by same reference characters whenever appropriate. In addition, it will be recognized that the respective drawings are merely schematic renderings and therefore are not necessarily actual reflections of the elements shown. First, an example of a structure of a lithium-ion secondary battery will be described as an example of the secondary battery of the present invention. Subsequently, a positive electrode mixture layer of a lithium-ion secondary battery will be described. Finally, an evaluation test of a lithium-ion secondary battery will be described.

Figure 2:
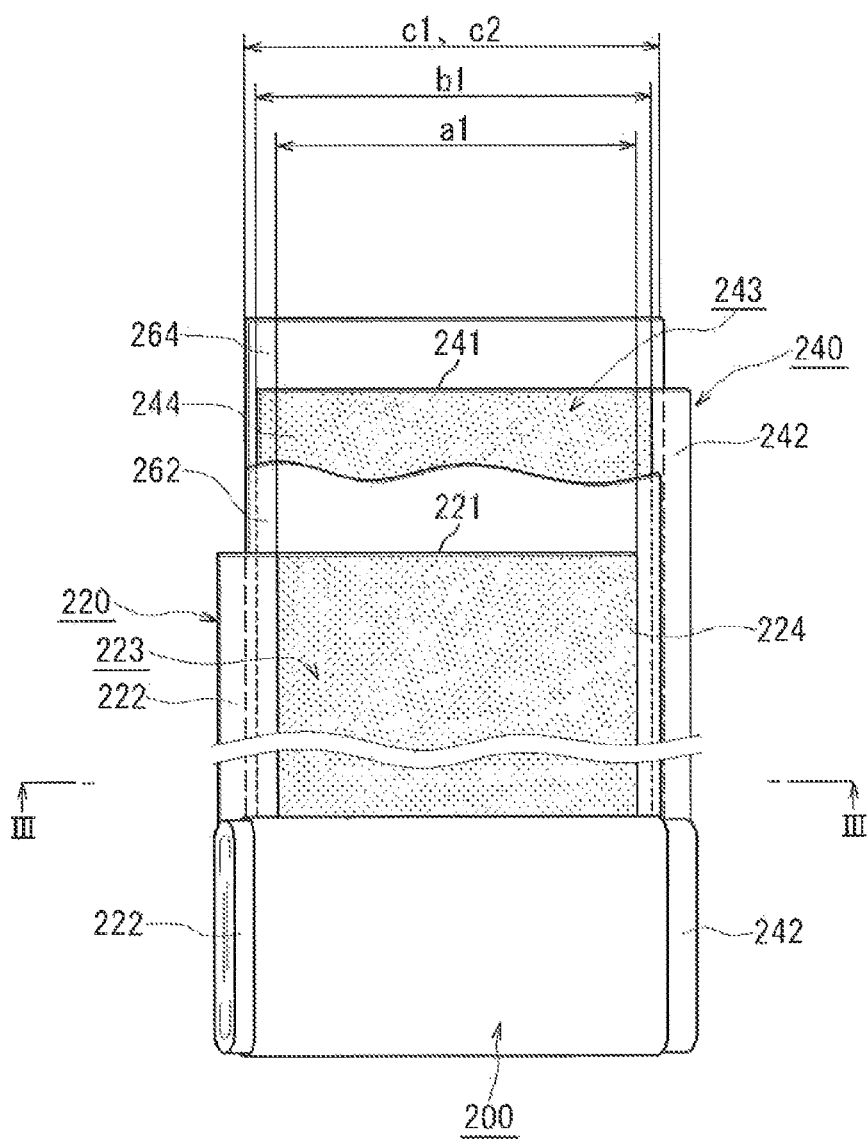
FIG. 2 is a diagram showing a wound electrode body of a lithium-ion secondary battery.
Figure 3:
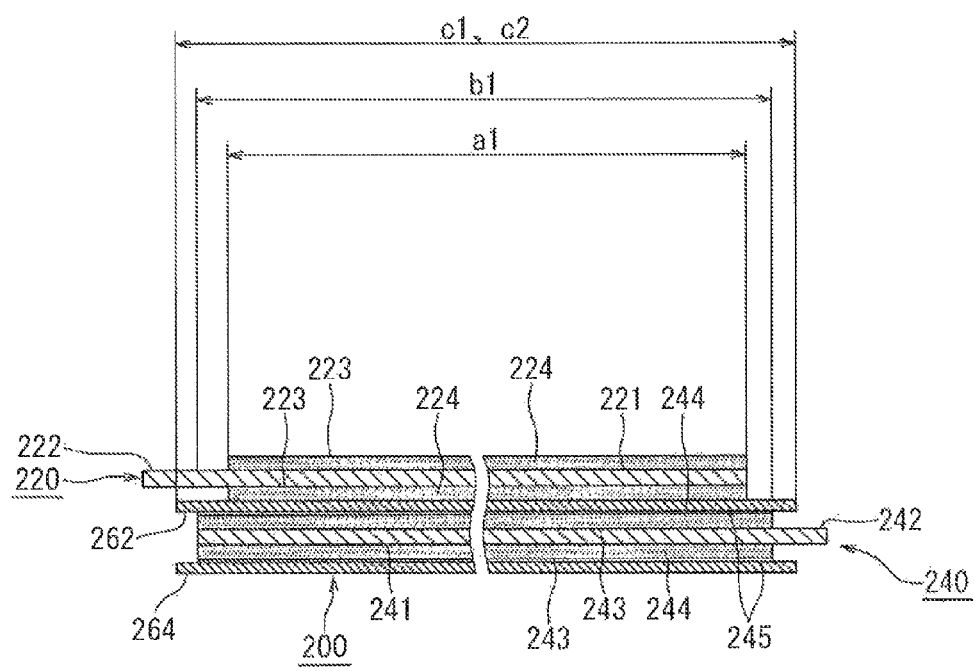
FIG. 3 is a diagram showing a cross-section taken along line III-III in FIG. 2.

FIG. 1 shows a lithium-ion secondary battery 100. As shown in FIG. 1, the lithium-ion secondary battery 100 comprises a wound electrode body 200 and a battery case 300. Furthermore, FIG. 2 is a diagram showing the wound electrode body 200. FIG. 3 shows a cross-section taken along line III-III in FIG. 2.

As shown in FIG. 2, the wound electrode body 200 comprises a positive electrode sheet 220, a negative electrode sheet 240, and separators 262 and 264. The positive electrode sheet 220, the negative electrode sheet 240, and the separators 262 and 264 are respectively band-like sheet materials.

<Positive Electrode Sheet 220>

As shown in FIG. 2, the positive electrode sheet 220 comprises a band-like positive electrode current collector 221 (positive electrode core). A metallic foil suitable for a positive electrode may be preferably used as the positive electrode current collector 221. A band-like aluminum foil having a predetermined width is used as the positive electrode current collector 221. In addition, the positive electrode sheet 220 comprises an uncoated portion 222 and a positive electrode mixture layer 223. The uncoated portion 222 is set along one width-direction edge of the positive electrode current collector 221. The positive electrode mixture layer 223 is a layer coated with a positive electrode mixture 224 containing a positive electrode active material. With the exception of the uncoated portion 222 set on the positive electrode current collector 221, the positive electrode mixture 224 coats both surfaces of the positive electrode current collector 221.

<Positive Electrode Mixture 224, Positive Electrode Active Material>

In this case, the positive electrode mixture 224 is a mixture obtained by mixing in a solvent a positive electrode active material, an electrically conductive material, a binder, a thickener and the like. A material used as a positive electrode active material of a lithium-ion secondary battery can be used as the positive electrode active material. Examples of a positive electrode active material include lithium transition metal oxides such as $LiNiCoMnO_2$ (lithium-nickel-cobalt-manganese complex oxide), $LiNiO_2$ (lithium nickelate), $LiCoO_2$ (lithium cobaltate), $LiMn_2O_4$ (lithium manganate), and $LiFePO_4$ (iron lithium phosphate). For example, $LiMn_2O_4$ has a spinel structure. In addition, $LiNiO_2$ and $LiCoO_2$ have a layered evaporitic structure. Furthermore, for example, $LiFePO_4$ has an olivine structure. $LiFePO_4$ having an olivine structure includes, for example, particles in the order of nanometers. In addition, $LiFePO_4$ having an olivine structure can be further coated by a carbon film.

<Electrically Conductive Material>

Examples of the electrically conductive material include carbon materials such as carbon powders and carbon fibers. One type of material selected from such electrically conductive materials may be used alone or two or more types may be used in combination. Examples of carbon powders that can be used include various types of carbon black (such as acetylene black, oil furnace black, graphitized carbon black, carbon black, graphite, and Ketjen black) and graphite powder.

<Binder, Thickener, and Solvent>

For the binder, a polymer can be used which is dispersible or dissolvable in the solvent used. For example, in a positive electrode mixture composition that uses an aqueous solvent, a water-soluble or water-dispersible polymer can be used favorably, examples of which include: cellulose-based polymers (for example, polyvinyl alcohol (PVA) and polytetrafluoroethylene (PTFE)) such as carboxymethyl cellulose (CMC) or hydroxypropyl methyl cellulose (HPMC); fluorine-based resins (for example, a vinyl acetate copolymer and styrene butadiene rubber (SBR)) such as tetrafluoroethylene-hexafluoropropylene copolymer (FEP); and rubbers such as an acrylic acid-modified SBR resin (SBR latex). In addition, in a positive electrode mixture composition that uses a non-aqueous solvent, polymers such as polyvinylidene fluoride (PVDF) or polyvinylidene chloride (PVDC) can be used favorably. In addition to functioning as a binder, the above-mentioned examples of polymer materials can also be used for the purpose of demonstrating a function as a thickener or other additives in the above-mentioned composition. Any aqueous solvent or non-aqueous solvent can be used as the solvent. A preferable example of a non-aqueous solvent is N-methyl-2-pyrrolidone (NMP).

A weight ratio of the positive electrode active material in the entire positive electrode mixture is favorably approximately 50% by weight or more (and typically 50 to 95% by weight), and normally the ratio is more favorably approximately 70 to 95% by weight (for example, 75 to 90% by weight). In addition, the ratio of the electrically conductive material in the entire positive electrode mixture can favorably be, for example, approximately 2 to 20% by weight, and normally the ratio is favorably approximately 2 to 15% by weight. In a composition that uses a binder, the ratio of the binder in the entire positive electrode mixture can be, for example, approximately 1 to 10% by weight, and normally the ratio is favorably approximately 2 to 5% by weight.

<Negative electrode sheet 240>

As shown in FIG. 2, the negative electrode sheet 240 comprises a band-like negative electrode current collector 241 (negative electrode core). A metallic foil suitable for a negative electrode may be preferably used as the negative electrode current collector 241. In the present embodiment, a band-like copper foil having a predetermined width is used as the negative electrode current collector 241. In addition, the negative electrode sheet 240 comprises an uncoated portion 242 and a negative electrode mixture layer 243. The uncoated portion 242 is set along one width-direction edge of the negative electrode current collector 241. The negative electrode mixture layer 243 is a layer coated with a negative electrode mixture 244 containing a negative electrode active material. With the exception of the uncoated portion 242 set on the negative electrode current collector 241, the negative electrode mixture 244 coats both surfaces of the negative electrode current collector 241.

<Negative Electrode Mixture 244>

In this case, the negative electrode mixture 244 is a mixture of a negative electrode active material, a thickener, a binder, and the like. A material used as a negative electrode active material of a lithium-ion secondary battery can be used as the negative electrode active material. Examples of a negative electrode active material include carbon-based materials such as natural graphite, artificial graphite, and an amorphous carbon of natural graphite or artificial graphite, lithium transition metal oxide, and lithium transition metal nitride. Moreover, a negative electrode active material is itself electrically conductive. Therefore, an electrically conductive material is added to the negative electrode mixture 244 when necessary. In addition, in this example, a heat-resistant layer (HRL) 245 is further formed on a surface of the negative electrode mixture layer 243 as shown in FIG. 3. The heat-resistant layer 245 is mainly formed of a metal oxide (for example, alumina). Moreover, in this lithium-ion secondary battery 100, the heat-resistant layer 245 is formed on a surface of the negative electrode mixture layer 243. Although not shown, for example, a heat-resistant layer may be formed on surfaces of the separators 262 and 264.

<Negative Electrode Active Material>

Furthermore, one type or two or more types of materials conventionally used in lithium-ion secondary batteries can be used without particular limitation for the negative electrode active material. Examples of these materials include particulate carbon materials (carbon powder) containing a graphite structure (a layered structure) in at least a portion thereof. More specifically, carbon materials having a so-called graphitic structure (graphite), a non-graphitizable carbonaceous structure (hard carbon), a graphitizable carbonaceous structure (soft carbon), or a combination thereof can be used. For example, graphite particles such as natural graphite can be used. Furthermore, an appropriate quantity of a thickener is mixed into the negative electrode mixture in order to maintain dispersion of the negative electrode active material. A thickener, a binder, or an electrically conductive material similar to those used in the positive electrode mixture can be used in the negative electrode mixture.

Although there are no particular limitations thereon, the ratio of the negative electrode active material in the entire negative electrode mixture can be approximately 80% by weight or more (for example, 80 to 99% by weight). Favorably, the ratio of the negative electrode active material in the entire negative electrode mixture is approximately 90% by weight or more (for example, 90 to 99% by weight, and more favorably, 95 to 99% by weight). In a composition that uses a binder, the ratio of the binder in the entire negative electrode mixture can be, for example, approximately 0.5 to 10% by weight, and normally the ratio is favorably approximately 1 to 5% by weight. The positive electrode mixture layer 223 and the negative electrode mixture layer 243 are respectively formed by being coated onto the positive electrode current collector 221 or the negative electrode current collector 241 and by being subsequently subjected to drying and rolling.

<Coating of Mixture>

In the coating step, the positive electrode mixture 224 or the negative electrode mixture 244 is coated onto a sheet-shaped current collector (221, 241). A conventionally known suitable coating device such as a slit coater, a die coater, a comma coater or a gravure coater can be used for the coating step. In this case, by using an elongated band-like sheet-shaped current collector, the positive electrode mixture 224 or the negative electrode mixture 244 can be continuously coated on the current collector.

<Drying Step>

In the drying step, the positive electrode mixture 224 or the negative electrode mixture 244 coated on the sheet-shaped current collector is dried. When doing so, suitable drying conditions may be set in order to prevent migration. In this case, by using an elongated band-like sheet-shaped current collector and passing the current collector along a guideway provided inside a drying oven, the positive electrode mixture 224 or the negative electrode mixture 244 coated on the current collector can be continuously dried.

<Rolling Step>

Furthermore, in the rolling step, the positive electrode mixture layer 223 or the negative electrode mixture layer 243 dried in the drying step is pressed in a thickness direction to obtain a sheet-shaped positive electrode (positive electrode sheet) having target physical properties. Examples of methods that can be suitably used to carry out the pressing described above include conventionally known roll pressing methods and plate pressing methods.

<Separators 262 and 264>

The separators 262 and 264 are members that separate the positive electrode sheet 220 and the negative electrode sheet 240 from each other. In this example, the separators 262 and 264 are constituted by band-like sheet members with a predetermined width which have a plurality of minute holes. For example, a separator made of a porous polyolefin-based resin and having a single-layer structure or a laminated structure may be used as the separators 262 and 264. In this example, as shown in FIGS. 2 and 3, a width $b1$ of the negative electrode mixture layer 243 is slightly wider than a width $a1$ of the positive electrode mixture layer 223. Furthermore, widths $c1$ and $c2$ of the separators 262 and 264 are slightly wider than the width $b1$ of the negative electrode mixture layer 243 ($c1$, $c2 > b1 > a1$).

<Wound Electrode Body 200>

The positive electrode sheet 220 and the negative electrode sheet 240 of the wound electrode body 200 are laminated and wound with the separators 262 and 264 interposed between the positive electrode sheet 220 and the negative electrode sheet 240.

In this example, as shown in FIG. 2, the positive electrode sheet 220, the negative electrode sheet 240, and the separators 262 and 264 are laminated with their lengthwise directions aligned in an order of: the positive electrode sheet 220, the separator 262, the negative electrode sheet 240, and the separator 264. In doing so, the separators 262 and 264 are laminated onto the positive electrode mixture layer 223 and the negative electrode mixture layer 243. Furthermore, the width of the negative electrode mixture layer 243 is slightly wider than that of the positive electrode mixture layer 223 and the negative electrode mixture layer 243 is laminated so as to cover the positive electrode mixture layer 223. Accordingly, lithium ions (Li) can migrate more reliably between the positive electrode mixture layer 223 and the negative electrode mixture layer 243 during charging and discharging.

In addition, an uncoated portion 222 of the positive electrode sheet 220 and an uncoated portion 242 of the negative electrode sheet 240 are laminated so as to mutually protrude toward opposite sides in the width direction of the separators 262 and 264. The laminated sheet material (for example, the positive electrode sheet 220) is wound around a winding axis set in the width direction.

Moreover, with the wound electrode body 200, the positive electrode sheet 220, the negative electrode sheet 240, and the separators 262 and 264 are wound laminated in a predetermined order. In this process, the respective sheets are laminated while controlling positions thereof using a positioning mechanism such as EPC (edge position control). In doing so, the negative electrode mixture layer 243 is laminated so as to cover the positive electrode mixture layer 223 albeit in a state where the separators 262 and 264 are interposed between the negative electrode mixture layer 243 and the positive electrode mixture layer 223.

<Battery Case 300>

Furthermore, in this example, as shown in FIG. 1, the battery case 300 is a so-called square battery case and comprises a container main body 320 and a lid 340. The container main body 320 has a bottomed square tube shape and is a flat box-shaped container with one side surface (upper surface) opened. The lid 340 is a member which is attached to the opening (upper surface opening) of the container main body 320 and which blocks the opening.

With a vehicle-mounted secondary battery, weight energy efficiency (capacity of battery per unit weight) is desirably improved in order to improve fuel efficiency. Therefore, a light-weight metal such as aluminum or an aluminum alloy (in this example, aluminum) is adopted as the container main body 320 and the lid 340 constituting the battery case 300. Accordingly, weight energy efficiency can be improved.

The battery case 300 has a flat rectangular inner space as a space for housing the wound electrode body 200. In addition, as shown in FIG. 1, a width of the flat inner space of the battery case 300 is slightly greater than the wound electrode body 200. In the present embodiment, the wound electrode body 200 is housed in the inner space of the battery case 300. As shown in FIG. 1, the wound electrode body 200 is housed in the battery case 300 in a state where the wound electrode body 200 is flatly deformed in one direction that is perpendicular to the winding axis.

In the present embodiment, the battery case 300 comprises the container main body 320 having a bottomed square tube shape and the lid 340 that blocks the opening of the container main body 320. In this case, for example, the container main body 320 may be molded by deep-draw molding or impact molding. Impact molding is a type of cold forging and is also referred to as impact extruding and impact pressing.

Furthermore, electrode terminals 420 and 440 are attached to the lid 340 of the battery case 300. The electrode terminals 420 and 440 penetrate the battery case 300 (the lid 340) and reach the outside of the battery case 300. Moreover, a safety valve 360 is provided on the lid 340.

In this example, the wound electrode body 200 is attached to the electrode terminals 420 and 440 which are attached to the battery case 300 (in this example, the lid 340). The wound electrode body 200 is housed in the battery case 300 in a state where the wound electrode body 200 is flatly deformed in one direction that is perpendicular to the winding axis. In addition, in the wound electrode body 200, the uncoated portion 222 of the positive electrode sheet 220 and the uncoated portion 242 of the negative electrode sheet 240 mutually protrude toward opposite sides in the width direction of the separators 262 and 264. Among the electrode terminals, one electrode terminal 420 is fixed to the uncoated portion 222 of the positive electrode current collector 221 and the other electrode terminal 440 is fixed to the uncoated portion 242 of the negative electrode current collector 241.

Figure 4:
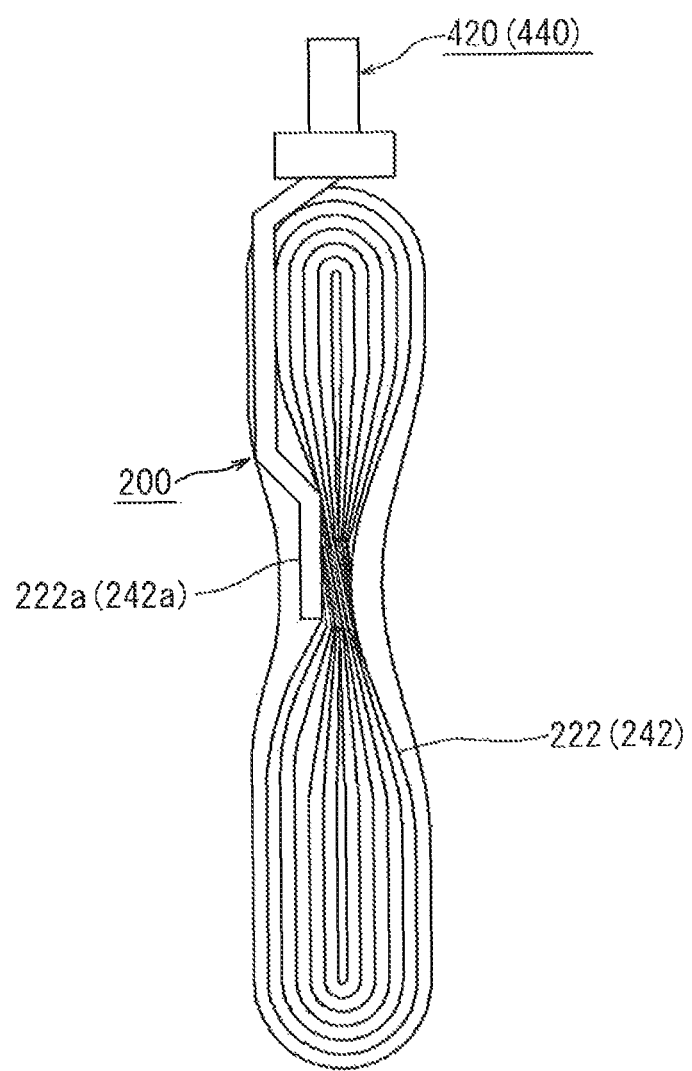
FIG. 4 is a side view showing a welding location of an uncoated portion and an electrode terminal of a wound electrode body.

In addition, in this example, as shown in FIG. 1, the electrode terminals 420 and 440 of the lid 340 extend to intermediate portions 222a and 242a of the uncoated portions 222 and 242 of the wound electrode body 200. Tips of the electrode terminals 420 and 440 are welded to the respective intermediate portions of the uncoated portions 222 and 242. FIG. 4 is a side view showing a welding location of the uncoated portions 222 and 242 and the electrode terminals 420 and 440 of the wound electrode body 200.

As shown in FIG. 4, on both sides of the separators 262 and 264, the uncoated portion 222 of the positive electrode current collector 221 and the uncoated portion 242 of the negative electrode current collector 241 are spirally exposed. In the present embodiment, the uncoated portions 222 and 242 are respectively assembled at the intermediate portions thereof and are welded to the tips of the electrode terminals 420 and 440. When doing so, due to differences in the respective materials, for example, ultrasonic welding is used to weld the electrode terminal 420 and the positive electrode current collector 221 to each other. In addition, for example, resistance welding is used to weld the electrode terminal 440 and the negative electrode current collector 241 to each other.

As described above, the wound electrode body 200 is attached to the electrode terminals 420 and 440 fixed to the lid 340 in a state where the wound electrode body 200 is pressed and bent flat. This wound electrode body 200 is housed in the flat inner space of the container main body 320. After the wound electrode body 200 is housed, the container main body 320 is blocked by the lid 340. A joint 322 (refer to FIG. 1) of the lid 340 and the container main body 320 is welded and sealed by, for example, laser welding. As described above, in this example, the wound electrode body 200 is positioned inside the battery case 300 by the electrode terminals 420 and 440 fixed to the lid 340 (the battery case 300).

<Electrolyte Solution>

Subsequently, an electrolyte solution is injected into the battery case 300 from an inlet provided on the lid 340. As the electrolyte solution, in this example, an electrolyte solution in which $LiPF_6$ is contained at a concentration of approximately 1 mol/liter in a mixed solvent of ethylene carbonate and diethyl carbonate (for example, a mixed solvent with a volume ratio of around 1:1) is used. Subsequently, a metallic sealing cap is attached (for example, by welding) to the inlet to seal the battery case 300. Moreover, as the electrolyte solution, a non-aqueous electrolyte solution conventionally used in a lithium-ion secondary battery can be used.

<Outgassing Path>

In addition, in this example, the flat inner space of the battery case 300 is slightly wider than the flatly-deformed wound electrode body 200. Gaps 310 and 312 are provided on both sides of the wound electrode body 200 between the wound electrode body 200 and the battery case 300. The gaps 310 and 312 act as outgassing paths.

With the lithium-ion secondary battery 100 configured as described above, temperature rises when an overcharge occurs. When the temperature of the lithium-ion secondary battery 100 rises, the electrolyte solution is decomposed and a gas is generated. The generated gas passes through the gaps 310 and 312 on both sides of the wound electrode body 200 between the wound electrode body 200 and the battery case 300 and through the safety valve 360, and is smoothly discharged to the outside. In this lithium-ion secondary battery 100, the positive electrode current collector 221 and the negative electrode current collector 241 are electrically connected to an external device through the electrode terminals 420 and 440 which penetrate the battery case 300.

<Other Battery Modes>

Moreover, the above description represents an example of a lithium-ion secondary battery. However, lithium-ion secondary batteries are not limited to the mode described above. Similarly, an electrode sheet obtained by coating a metallic foil with an electrode mixture may be used in various other battery modes. For example, a cylindrical battery and a laminated battery are known as other battery modes. A cylindrical battery is a battery in which a wound electrode body is housed in a cylindrical battery case. In addition, a laminated battery is a battery in which a positive electrode sheet and a negative electrode sheet are laminated with a separator interposed between the positive electrode sheet and the negative electrode sheet Moreover, while the lithium-ion secondary battery 100 is exemplified above, secondary batteries other than a lithium-ion secondary battery may also adopt similar structures.

Hereinafter, a positive electrode mixture layer 223 according to the present embodiment will be described.

<Positive Electrode Mixture Layer 223>

Figure 5:
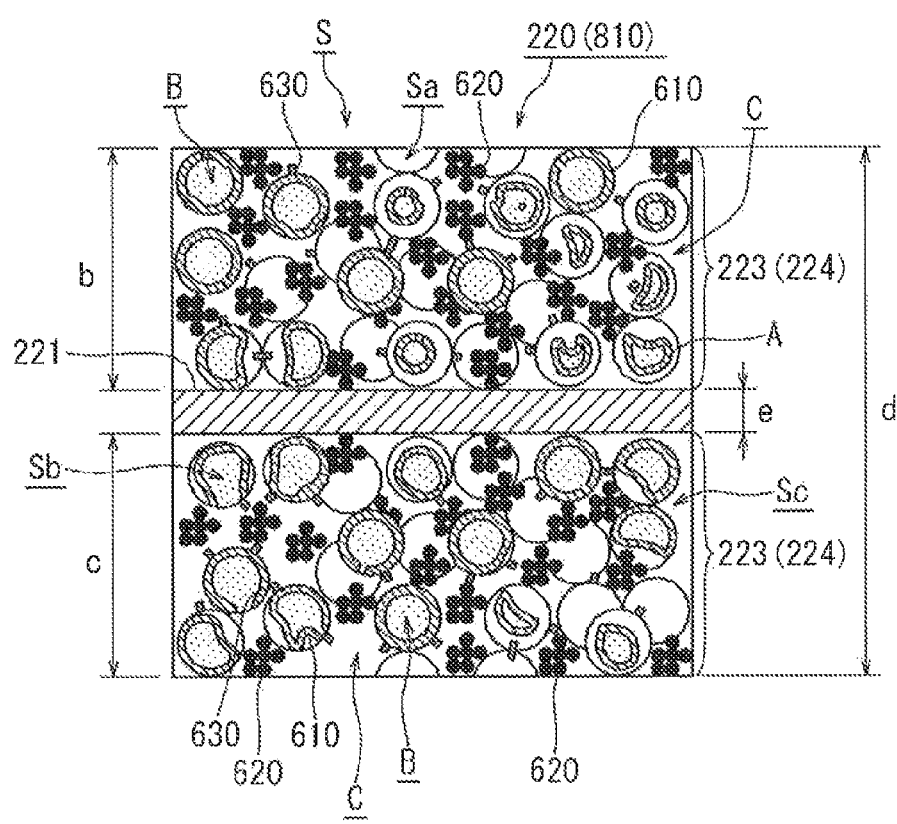
FIG. 5 is a sectional view showing a structure of a positive electrode mixture layer.

FIG. 5 is a cross-sectional view of the positive electrode sheet 220 of the lithium-ion secondary battery 100. Moreover, in FIG. 5, a positive electrode active material 610 and an electrically conductive material 620 in the positive electrode mixture layer 223 are schematically depicted enlarged so as to clarify the structure of the positive electrode mixture layer 223. In the present embodiment, with the positive electrode sheet 220, both surfaces of the positive electrode current collector 221 are respectively coated by the positive electrode mixture 224 as shown in FIG. 5. This layer of the positive electrode mixture 224 (the positive electrode mixture layer 223) contains the positive electrode active material 610, the electrically conductive material 620, and a binder 630.

<Holes of Positive Electrode Mixture Layer 223>

As described above, the positive electrode mixture layer 223 is created by coating a current collector (metal film) with a positive electrode mixture, which is then subjected to drying and rolling. In the positive electrode mixture layer 223, as shown in FIG. 5, respective particles are bonded to each other due to the effect of the binder 630. Since the positive electrode mixture layer 223 is in a state where the positive electrode active material 610 and the electrically conductive material 620 are bonded by the binder 630, a large number of minute cavities exist between the respective particles. In addition, the electrically conductive material 620 is smaller than the positive electrode active material 610 (secondary particles) and penetrate into a plurality of gaps of the positive electrode active material 610. The positive electrode active material 610 and the positive electrode current collector 221 are electrically connected to each other by the electrically conductive material 620. In addition, the positive electrode mixture layer 223 has minute gaps which may be described as cavities. An electrolyte solution (not shown) penetrates into the minute gaps of the positive electrode mixture layer 223. Hereinafter, the gaps (cavities) formed inside the positive electrode mixture layer 223 will be referred to as "holes" when appropriate.

<Positive Electrode Active Material 610>

Figure 6:
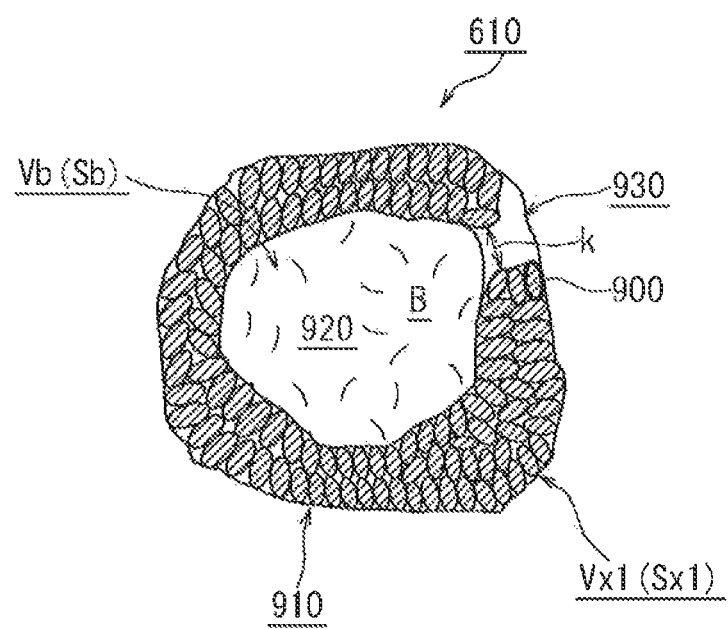
FIG. 6 is a cross-sectional view showing an example of positive electrode active material particles.

FIG. 6 schematically shows the positive electrode active material 610. As shown in FIG. 6, in the present embodiment, the positive electrode active material 610 includes secondary particles 910, a hollow portion 920, and a through hole 930. In this case, the secondary particles 910 are particles formed by the aggregation of a plurality of primary particles (not shown) of a lithium transition metal oxide. The hollow portion 920 is an internal hole formed in the secondary particles 910. The through hole 930 is a hole that penetrates the secondary particles 910 so as to connect the outside of the secondary particles 910 with the hollow portion 920. In this case, a "hollow-structure positive electrode active material 610" refers to the secondary particles 910 which include the hollow portion 920 and the through hole 930. The secondary particles have a particle diameter ranging from approximately 3 μm to 12 μm and more favorably from approximately 3 μm to 8 μm. Note that a median diameter (d50) obtained from a particle size distribution as measured by a particle size distribution analyzer based on a light scattering method is adopted as the particle diameter.

<Electrically Conductive Material 620>

In addition, for the electrically conductive material 620, carbon powders such as acetylene black, oil furnace black, graphitized carbon black, carbon black, graphite, Ketjen black, and graphite powder can be used. In this case, one type of a carbon powder or a plurality of types of carbon powder may be mixed at a predetermined ratio for the electrically conductive material 620. Here, the electrically conductive material 620 has a smaller particle diameter than the positive electrode active material 610. For example, the particle diameter of the primary particles of the electrically conductive material 620 ranges from approximately 10 μm to 100 μm.

For example, as shown in FIG. 5, the positive electrode mixture layer 223 has holes B which allow an electrolyte solution to penetrate into the positive electrode active material 610. The holes B formed inside the positive electrode active material 610 in the positive electrode mixture layer 223 will be referred to as "in-particle holes" as appropriate. In addition, for example, the positive electrode mixture layer 223 has a large number of holes C which allow penetration of the electrolyte solution into gaps created between the positive electrode active material 610 and the electrically conductive material 620. The holes C formed outside the positive electrode active material 610 in the positive electrode mixture layer 223 will be referred to as "out-of-particle holes" as appropriate.

The following denotations will be adopted.

a: Thickness of positive electrode mixture layer 223 coating both surfaces of positive electrode current collector 221
b, c: Thickness of positive electrode mixture layer 223 on one surface of positive electrode current collector 221
d: Thickness of positive electrode sheet
e: Thickness of positive electrode current collector 221
B: Holes formed inside positive electrode active material 610 in positive electrode mixture layer 223 (in-particle holes)
C: Holes formed outside positive electrode active material 610 in positive electrode mixture layer 223 (out-of-particle holes)
M: Weight of positive electrode mixture layer 223
Mv: Coating weight of both surfaces of positive electrode mixture layer 223
S: Surface area of positive electrode sheet 220 in plan view of sample
Sa: Apparent cross-sectional area of positive electrode mixture layer 223
Sb: Surface area occupied by in-particle holes B among cross-section of positive electrode mixture layer 223
Sc: Surface area occupied by out-of-particle holes C among cross-section of positive electrode mixture layer 223
Sbc: Surface area occupied by holes (B, C) among cross-section of positive electrode mixture layer 223
Sx1: Actual cross-sectional area of positive electrode active material 610 among cross-section of positive electrode mixture layer 223
Va: Apparent volume of positive electrode mixture layer 223
Vb: Total inner volume of in-particle holes B in positive electrode mixture layer 223
Vc: Total inner volume of out-of-particle holes C in positive electrode mixture layer 223
Vbc: Inner volume of holes (B, C) in positive electrode mixture layer 223
Vx: Actual volume of positive electrode mixture layer 223
Vx1: Actual volume of positive electrode active material 610 in positive electrode mixture layer 223
Wb: In-particle porosity
Wc: Out-of-particle porosity
Wx1: Volume ratio of hollow portion 920 per unit volume (unit actual volume) of positive electrode active material 610
X: True density of positive electrode active material 610
Y: True density of electrically conductive material 620
Z: True density of binder 630
α: Weight ratio of positive electrode active material 610 in positive electrode mixture layer 223
β: Weight ratio of electrically conductive material 620 in positive electrode mixture layer 223
γ: Weight ratio of binder 630 in positive electrode mixture layer 223

In this case, an "apparent volume" refers to a volume including holes. In addition, an "actual volume" refers to a volume excluding holes. Furthermore, an "actual cross-sectional area" refers to a cross-sectional area excluding holes. Moreover, "true density" is a value obtained by dividing weight by actual volume.

In addition, in the present embodiment, a ratio (Vbc/Va) of an inner volume Vbc of holes (B, C) formed inside the positive electrode mixture layer 223 to an apparent volume Va of the positive electrode mixture layer 223 satisfies $0.25 \leq (Vbc/Va) \leq 0.60$. Furthermore, a ratio (Vb/Vc) of a total inner volume Vb of holes B formed inside the positive electrode active material 610 in the positive electrode mixture layer 223 to a total inner volume Vc of holes C formed outside the positive electrode active material 610 in the positive electrode mixture layer 223 satisfies $0.05 \leq (Vb/Vc) \leq 2.5$. In this case, the apparent volume Va of the positive electrode mixture layer 223 is a volume of the entire positive electrode mixture layer 223 including the holes (B, C). The structure described above enables performance of the lithium-ion secondary battery 100 to be improved.

<Porosity (Vbc/Va)>

The ratio (Vbc/Va) between the inner volume Vbc of the holes (B, C) formed inside the positive electrode mixture layer 223 and the apparent volume Va of the positive electrode mixture layer 223 represents a proportion of the holes (B, C) formed inside the positive electrode mixture layer 223. The greater the ratio (Vbc/Va), the greater the inner volume of the holes (B, C) through which an electrolyte solution can penetrate into the positive electrode mixture layer 223. The ratio (Vbc/Va) can be referred to as "porosity" or "in-mixture layer total porosity" when appropriate. There are various ways to obtain the ratio (Vbc/Va).

<Measurement Method of Va>

For example, as shown in FIG. 5, the apparent volume Va of the positive electrode mixture layer can be calculated as a product of a surface area S of a sample of the positive electrode sheet 220 in a plan view and a thickness a (not shown) of the positive electrode mixture layer 223 (Va=S×a).

In the present embodiment, the positive electrode mixture layer 223 is formed on both surfaces of the positive electrode current collector 221. Therefore, the thickness a of the positive electrode mixture layer 223 can be obtained as a sum of thicknesses b and c of the positive electrode mixture layers 223 of both surfaces (a=b+c). In addition, as another method, the thickness a of the positive electrode mixture layer 223 can be obtained as a difference (d−e) between a thickness d of the entire positive electrode sheet 220 and a thickness e of the positive electrode current collector 221 (a=d−e). Furthermore, the surface area S of a sample of the positive electrode sheet 220 in plan view can be readily obtained by, for example, cutting out a square or a rectangle from a sample of the positive electrode sheet 220. In this manner, by obtaining the surface area S of a sample of the positive electrode sheet 220 in plan view and the thickness a of the positive electrode mixture layer 223, the apparent volume Va of the positive electrode mixture layer 223 can be obtained.

<Measurement method of Vbc>

For example, the inner volume Vbc of the holes (B, C) formed inside the positive electrode mixture layer 223 can be measured using a mercury porosimeter. Moreover, as far as this measurement method is concerned, a "hole" refers to a hole opened to the outside. With this method, closed spaces inside the positive electrode mixture layer 223 are not included in "holes". A mercury porosimeter is an instrument for measuring a micropore distribution of a porous body by a mercury intrusion method. For example, AutoPore III 9410 manufactured by Shimadzu Corporation can be used as the mercury porosimeter. In this case, for example, a measurement may be performed between 4 psi to 60,000 psi (a micropore range from 50 μm to 0.003 μm)

For example, a plurality of samples is cut out from the positive electrode sheet 220. Next, for the samples, an inner volume of holes (B, C) contained in the positive electrode mixture layer 223 is measured using a mercury porosimeter. A mercury porosimeter is an instrument for measuring a micropore distribution of a porous body by a mercury intrusion method. In the mercury intrusion method, first, a sample of the positive electrode sheet 220 is vacuumed and immersed in mercury. In this state, as pressure applied to the mercury is increased, the mercury gradually penetrates into smaller spaces. Therefore, an inner volume of the holes (B, C) in the positive electrode mixture layer 223 can be obtained based on a relationship between an amount of mercury having penetrated into the positive electrode mixture layer 223 and the pressure applied to the mercury. Due to the mercury intrusion method, the inner volume Vbc of the holes (B, C) contained in the positive electrode mixture layer 223 can be obtained.

<Calculation of Porosity (Vbc/Va)>

The porosity (Vbc/Va) can be obtained as a ratio between the inner volume Vbc of holes (B, C) contained in the positive electrode mixture layer 223, which can be obtained as described above, and the apparent volume Va (Va=S×a) of the positive electrode mixture layer. The ratio (Vbc/Va) obtained in this case represents a volume proportion at which holes penetrable by the electrolyte solution exist in the positive electrode mixture layer 223.

Particularly, in a case where the hollow-structure positive electrode active material 610 described above is used, holes are preferably included which enable an electrolyte solution to penetrate into the positive electrode mixture layer 223. Accordingly, the electrolyte solution can be perfused into the positive electrode mixture layer 223. According to findings made by the present inventor, when the hollow-structure positive electrode active material 610 described above is used, the ratio (Vbc/Va) of the positive electrode mixture layer 223 satisfies 0.25≤(Vbc/Va). More favorably, the ratio satisfies approximately 0.30≤(Vbc/Va). In addition, the ratio (Vbc/Va) favorably satisfies (Vbc/Va)≤0.60 and, for example, favorably satisfies (Vbc/Va)≤0.57.

Moreover, when porosity (Vbc/Va) becomes too low, an amount of the electrolyte solution that penetrates into the positive electrode mixture layer 223 decreases and makes it difficult for lithium ions (Li) to migrate between the positive electrode active material 610 and the electrolyte solution. This may cause battery resistance to increase. On the other hand, when porosity (Vbc/Va) becomes too high, required strength can no longer be obtained and, for example, cases may occur in which the positive electrode mixture layer 223 cannot be maintained during a process of cutting the positive electrode sheet (slitting process) or a process of winding the positive electrode sheet (winding process). Therefore, in order to achieve stable production, the afore-mentioned ratio (Vbc/Va) of the positive electrode mixture layer 223 desirably has an appropriate magnitude.

There are various other ways to obtain the porosity (Vbc/Va). Other measurement methods will be exemplified below.

<Another Measurement Method (1) of Porosity (Vbc/Va)>

For example, the porosity (Vbc/Va) is obtained by the equation below based on measured values of respective components which are measured prior to creating the positive electrode sheet 810.

$$\text{Porosity}(Vbc/Va) = [(d-e) - Mv \times \{(\alpha/X) + (\beta/Y) + (\gamma/Z)\}]/(d-e).$$

In other words,

Porosity (Vbc/Va)=[("thickness d of positive electrode sheet 220"−"thickness e of positive electrode current collector 221")−"coating weight Mv of both surfaces of positive electrode mixture layer 223"×{weight ratio α of positive electrode active material 610)/(true density X of positive electrode active material 610)+(weight ratio β of electrically conductive material 620)/(true density Y of electrically conductive material 620)+(weight ratio γ of binder 630)/(true density Z of binder 630)}]/("thickness d of positive electrode sheet 220"−"thickness e of positive electrode current collector 221").

Here, $Mv \times \{(\alpha/X)+(\beta/Y)+(\gamma/Z)\}$ represents a thickness of the positive electrode mixture layer 223 obtained when assuming that there are no holes in the positive electrode mixture layer 223.

In addition, for example, the "weight ratio α of the positive electrode active material 610", the "true density X of the positive electrode active material 610", the "weight ratio β of the electrically conductive material 620", the "true density Y of the electrically conductive material 620", the "weight ratio γ of the binder 630", and the "true density Z of the binder 630" can be measured prior to forming the positive electrode mixture layer 223. "True density" can be measured by, for example, a density measuring instrument such as a gas displacement pycnometer.

Furthermore, for example, a "thickness (d−e) of the positive electrode mixture layer 223" and the "coating weight Mv of the positive electrode mixture layer 223" can be measured after forming the positive electrode mixture layer 223. Alternatively, the "thickness (d−e) of the positive electrode mixture layer 223" and the "coating weight Mv of the positive electrode mixture layer 223" can be set as target values in the coating step or the rolling step of the positive electrode mixture layer 223.

In addition, in the present embodiment, as shown in FIG. 5, the positive electrode mixture layer 223 is formed on both surfaces of the positive electrode current collector 221. Therefore, porosity may be calculated in consideration of formation of the positive electrode mixture layer 223 on both surfaces of the positive electrode current collector 221.

<Another Measurement Method (2) of Porosity (Vbc/Va)>

Porosity (Vbc/Va) can be approximated by yet another method.

For example, the porosity (Vbc/Va) can be approximated with a cross-sectional sample of the positive electrode mixture layer 223 as a ratio (Sbc/Sa) between a surface area Sbc occupied by holes (B, C) included in a unit cross-sectional area of the positive electrode mixture layer 223 and an apparent cross-sectional area Sa of the positive electrode mixture layer 223. In this case, the ratio (Sbc/Sa) may be obtained from a plurality of cross-sectional samples of the positive electrode mixture layer 223. The greater the number of cross-sectional samples of the positive electrode mixture layer 223, the more accurate the approximation of porosity (Vbc/Va) by the ratio (Sbc/Sa). In this case, for example, cross-sectional samples may be taken along one arbitrary direction of the positive electrode sheet 220 from a plurality of cross-sections perpendicular to the one direction.

For example, the cross-sectional samples of the positive electrode mixture layer 223 may be obtained as cross-sectional SEM images. A cross-sectional SEM image is a cross-sectional photograph taken by an electron microscope. For example, an arbitrary cross-section of the positive electrode sheet 220 may be obtained by a CP process (Cross-section Polisher process). For example, a scanning electron microscope (FE-SEM) HITACHI S-4500 manufactured by Hitachi High-Technologies Corporation can be used as the electron microscope.

According to cross-sectional SEM images of the positive electrode mixture layer 223, based on differences in tonality and grayscale, a cross-section A of a constituent material of the positive electrode mixture layer 223 and holes (B, C) formed inside the positive electrode mixture layer 223 can be identified.

<In-Particle/Out-of-Particle Porosity Ratio (Vb/Vc)>

Next, the ratio (Vb/Vc) of the total inner volume Vb of holes B formed inside the positive electrode active material 610 in the positive electrode mixture layer 223 to the total inner volume Vc of holes C formed outside the positive electrode active material 610 in the positive electrode mixture layer 223 will be described. This ratio (Vb/Vc) is a ratio of inner volumes of the holes B (in-particle holes) and the holes C (out-of-particle holes) in the positive electrode mixture layer 223 and may be referred to as an "in-particle/out-of-particle porosity ratio". In addition, the in-particle/out-of-particle porosity ratio (Vb/Vc) can also be obtained by dividing a volume ratio of the in-particle holes B in the positive electrode mixture layer 223 by a volume ratio of the out-of-particle holes C in the positive electrode mixture layer 223.

<Measurement Method of in-Particle/Out-of-Particle Porosity Ratio (Vb/Vc)>

For example, the in-particle/out-of-particle porosity ratio (Vb/Vc) can be approximated by a ratio (Sb/Sc) between a surface area Sb occupied by the in-particle holes B and a surface area Sc occupied by the out-of-particle holes C among a cross-section of the positive electrode mixture layer 223. In this case, the surface area Sb is a total surface area occupied by in-particle holes B observed in a cross-section of the positive electrode mixture layer 223. In addition, the surface area Sc is a total surface area occupied by out-of-particle holes C observed in a cross-section of the positive electrode mixture layer 223.

For example, according to a cross-sectional SEM image of the positive electrode mixture layer 223, based on differences in tonality and grayscale, a cross-section A of a constituent material of the positive electrode mixture layer 223 and the holes (B, C) formed inside the positive electrode mixture layer 223 can be identified. In addition, contours of the secondary particles 910 of the positive electrode active material 610 included inside the positive electrode mixture layer 223 can also be identified. Therefore, the holes (B, C) formed inside the positive electrode mixture layer 223 can be distinguished between in-particle holes B and out-of-particle holes C. In addition, the cross-section A of a constituent material of the positive electrode mixture layer 223, the in-particle holes B formed inside the positive electrode active material 610, and the out-of-particle holes C formed outside the positive electrode active material 610 may be respectively extracted based on differences in tonality and grayscale in a cross-sectional SEM image. For the extraction process, for example, an image processing technique by a computer which performs a predetermined process according to a predetermined program can be used.

For example, let us assume that the number of dots included in the in-particle holes B of all positive electrode active material 610 included in a cross-sectional SEM image is the surface area Sb occupied by the in-particle holes B. In addition, let us assume that the number of dots included in the out-of-particle holes C formed outside of the positive electrode active material 610 among the positive electrode mixture layer 223 included in a cross-sectional SEM image is the surface area Sc occupied by the out-of-particle holes C. Accordingly, the ratio (Sb/Sc) between the surface area Sb occupied by the in-particle holes B and the surface area Sc occupied by the out-of-particle holes C can be approximately by a ratio between the number of dots included in the in-particle holes B and the number of dots included in the out-of-particle holes C.

Furthermore, the ratio (Sb/Sc) between the surface area Sb and the surface area Sc may be approximated from a plurality of cross-sectional SEM images. The greater the number of samples of cross-sectional SEM images (the greater the cross-sectional area), the more accurately the ratio (Sb/Sc) is able to approximate the in-particle/out-of-particle porosity ratio (Vb/Vc).

<Another Measurement Method (1) of in-Particle/Out-of-Particle Porosity Ratio (Vb/Vc)>

The in-particle/out-of-particle porosity ratio (Vb/Vc) can be expressed as a ratio between a proportion of the total inner volume Vb of the in-particle holes B in the positive electrode mixture layer 223 (in-particle porosity Wb) and a volume proportion of the total inner volume Vc of the out-of-particle holes C in the positive electrode mixture layer 223 (out-of-particle porosity Wc).

Ratio($Vb/Vc$)=(in-particle porosity $Wb$)/(out-of-particle porosity $Wc$)

Hereinafter, there are various measurement methods of the in-particle porosity Wb and the out-of-particle porosity Wc. Various measurement methods of the in-particle porosity Wb and the out-of-particle porosity Wc will be described below.

<In-Particle Porosity Wb>

"In-particle porosity Wb" represents a volume proportion of the total inner volume Vb of the in-particle holes B in the positive electrode mixture layer 223.

The "in-particle porosity Wb" can be calculated according to $Wb=\{Mv\times(\alpha/X)\times Wx1\}/(d-e)$.

In other words,

"In-particle porosity Wb"={"coating weight Mv of positive electrode mixture layer 223"×("weight ratio α of positive electrode active material 610 in positive electrode mixture layer 223"/"true density X of positive electrode active material 610")×"volume ratio Wx1 of hollow portion 920 per unit volume (unit actual volume) of positive electrode active material 610"}/"thickness ($d-e$) of positive electrode mixture layer 223".

Specifically, the "in-particle porosity Wb" is "total inner volume Vb of in-particle holes B in positive electrode mixture layer 223"/"apparent volume Va of positive electrode mixture layer 223".

In other words, $$Wb = Vb/Va.$$

Among the above, the "apparent volume Va of positive electrode mixture layer 223" can be obtained as a product (Va=S×a) of the "surface area S of positive electrode sheet 220 in plan view of sample" and the "thickness a of positive electrode mixture layer 223" (not shown). In addition, the thickness a of the positive electrode mixture layer 223 can be obtained as a difference ($d-e$) between the thickness d of the entire positive electrode sheet 220 and the thickness e of the positive electrode current collector 221 (a=d−e).

Therefore, $$Va = S \times (d-e).$$

In addition, the "total inner volume Vb of in-particle holes B in positive electrode mixture layer 223" is "actual volume Vx1 of positive electrode active material 610 in positive electrode mixture layer 223"×"volume ratio Wx1 of hollow portion 920 per unit volume (unit actual volume) of positive electrode active material 610".

In other words, $$Vb = Vx1 \times Wx1.$$

In this case, "actual volume Vx1 of positive electrode active material 610 in positive electrode mixture layer 223"="weight M of positive electrode mixture layer 223"× "weight ratio α of positive electrode active material 610 in positive electrode mixture layer 223"/"true density X of positive electrode active material 610".

In other words, since $$Vx1 = M \times (\alpha/X),$$

$$Vb = M \times (\alpha/X) \times Wx1$$

is true.

Furthermore, "weight M of positive electrode mixture layer 223"="surface area S of positive electrode sheet 220"× "coating weight Mv of positive electrode mixture layer 223 (weight of positive electrode mixture layer 223 per unit area of positive electrode sheet 220)". In other words, since $$M = S \times Mv,$$

$$Vb = S \times Mv \times (\alpha/X) \times Wx1$$

is true.

Therefore,

"Total inner volume Vb of in-particle holes B in positive electrode mixture layer 223"="Surface area S of positive electrode sheet 220"×"coating weight Mv of positive electrode mixture layer 223 (weight per unit area)"×("weight ratio α of positive electrode active material 610 in positive electrode mixture layer 223"/"true density X of positive electrode active material 610")×"volume ratio Wx1 of hollow portion 920 per unit volume (unit actual volume) of positive electrode active material 610".

As described above, $$Wb = Vb/Va,$$

$$Vb = S \times Mv \times (\alpha/X) \times Wx1, \text{ and}$$

$$Va = S \times (d-e).$$

Therefore, $$Wb = Mv \times (\alpha/X) \times Wx1/(d-e)$$

is true.

In other words,

"In-particle porosity Wb"={"coating weight Mv of positive electrode mixture layer 223"×("weight ratio α of positive electrode active material 610 in positive electrode mixture layer 223"/"true density X of positive electrode active material 610")×"volume ratio Wx1 of hollow portion 920 per unit volume (unit actual volume) of positive electrode active material 610"}/"thickness ($d-e$) of positive electrode mixture layer 223".

Among the above, the "coating weight of positive electrode mixture layer 223" can be obtained by, for example, subtracting the weight of the positive electrode current collector 221 per unit area from the weight of the positive electrode sheet 220 per unit area. In other words, the "coating weight of positive electrode mixture layer 223" can be adjusted by varying conditions of the coating step of the positive electrode mixture.

<Volume Ratio Wx1 of Hollow Portion 920>

The volume ratio Wx1 of the hollow portion 920 is the "volume ratio of hollow portion 920 per unit volume (unit actual volume) of positive electrode active material 610 (particle/hole volume ratio)". This can be expressed by the following equation.

Volume ratio Wx1 of hollow portion 920=(total inner volume Vb of in-particle holes B in positive electrode mixture layer 223)/(actual volume Vx1 of positive electrode active material 610 in positive electrode mixture layer 223)

In other words, $$Wx1 = Vx1.$$

The volume ratio Wx1 of the hollow portion 920 can be measured based on a cross-sectional image of the positive electrode mixture layer 223 such as that shown in FIG. 5. The cross-sectional image can be obtained by, for example, a cross-sectional SEM image of the positive electrode mixture layer 223. According to a cross-sectional SEM image, a cross-section of the positive electrode active material 610, the in-particle holes B, and the out-of-particle holes C regarding the positive electrode active material 610 whose cross-section is shown can be distinguished from one another based on differences in tonality and grayscale.

The volume ratio Wx1 of the hollow portion 920 is a ratio (Vb/Vx1) between the total inner volume Vb of the in-particle holes B in the positive electrode mixture layer 223 and the actual volume Vx1 of the positive electrode active material 610 in the positive electrode mixture layer 223. The ratio (Vb/Vx1) can be approximated by a ratio (Sb/Sx1) between the area Sb occupied by the in-particle holes B among a cross-section of the positive electrode mixture layer 223 and the actual cross-sectional area Sx1 of the positive electrode active material 610 among the positive electrode mixture layer 223. The ratio (Sb/Sx1) can be approximated by a ratio between the number of dots in a portion distinguished as a cross-section of the positive electrode active material 610 and the number of dots in a portion distinguished as a cross-section of the in-particle holes B among a cross-sectional SEM image. In this case, approximation can be performed more accurately by increasing the number of cross-section samples.

<Out-of-Particle Porosity Wc>

Next, "out-of-particle porosity Wc" will be described.

"Out-of-particle porosity Wc" represents a volume proportion of the inner volume Vc of the out-of-particle holes C in the positive electrode mixture layer 223.

Therefore, "out-of-particle porosity Wc" is $$Wc=Vc/Va.$$

Furthermore, since $$Vc=Vbc-Vb,$$

$$Wc=(Vbc-Vb)/Va$$

is true.
In addition, since $$Vbc=Va-Vx,$$

$$Wc=(Va-Vx-Vb)Va$$

is true.

In other words, "out-of-particle porosity Wc" is "Out-of-particle porosity Wc"="total inner volume Vc of out-of-particle holes C in positive electrode mixture layer 223"/"apparent volume Va of positive electrode mixture layer 223"; "Out-of-particle porosity Wc"=("inner volume Vbc of holes (B, C) in positive electrode mixture layer 223"–"total inner volume Vb of holes B inside secondary particles 910 in positive electrode mixture layer 223")/"apparent volume Va of positive electrode mixture layer 223"; and "Out-of-particle porosity Wc"=("apparent volume Va of positive electrode mixture layer 223"–"actual volume Vx of positive electrode mixture layer 223"–"total inner volume Vb of in-particle holes B in positive electrode mixture layer 223")/"apparent volume Va of positive electrode mixture layer 223".

<Calculation of in-Particle/Out-of-Particle Porosity Ratio (Vb/Vc)>

The in-particle/out-of-particle porosity ratio (Vb/Vc) is a ratio (Vb/Vc) between the total inner volume Vb of the in-particle holes B in the positive electrode mixture layer 223 and the total inner volume Vc of the out-of-particle holes C in positive electrode mixture layer 223. The in-particle/out-of-particle porosity ratio (Vb/Vc) can be approximated by a ratio (Wb/Wc) between the in-particle porosity Wb and the out-of-particle porosity Wc which are obtained as described above. As shown, the "in-particle/out-of-particle porosity ratio (Vb/Vc)" can be calculated using various methods.

In the lithium-ion secondary battery 100, the hollow-structure positive electrode active material 610 described above is used in the positive electrode mixture layer 223. In addition, holes which allow an electrolyte solution to penetrate into the positive electrode mixture layer 223 are appropriately provided. Furthermore, the in-particle/out-of-particle porosity ratio (Vb/Vc) satisfies 0.05≤(Vb/Vc)≤2.5. Moreover, from the perspective of improving performance of the lithium-ion secondary battery 100, the in-particle/out-of-particle porosity ratio (Vb/Vc) favorably satisfies 0.07<(Vb/Vc), more favorably satisfies 0.2<(Vb/Vc), and even more favorably satisfies 0.5<(Vb/Vc). Furthermore, the ratio (Vb/Vc) favorably satisfies (Vb/Vc)<2.0 and more favorably satisfies (Vb/Vc)<1.95.

An excessively low in-particle/out-of-particle porosity ratio (Vb/Vc) means that there are less holes B inside the secondary particles 910 than the holes C outside the secondary particles 910 in the positive electrode active material 610. In addition, since an amount of the electrolyte solution penetrating into the secondary particles 910 is small, less contact occurs between the electrolyte solution and the positive electrode active material 610 (primary particles) inside the secondary particles 910. Therefore, an excessively low in-particle/out-of-particle porosity ratio (Vb/Vc) does not contribute to improving the performance of the lithium-ion secondary battery 100. On the other hand, an excessively high in-particle/out-of-particle porosity ratio (Vb/Vc) reduces strength of the positive electrode mixture layer 223 and, for example, causes the positive electrode sheet 810 to bend significantly during the rolling step.

In contrast, the ratio (Vb/Vc) in the range described above means that appropriate numbers of the holes B and C respectively exist inside and outside the secondary particles 910 of the positive electrode active material 610. In this case, since an appropriate amount of the electrolyte solution penetrates into the secondary particles 910, the electrolyte solution and the positive electrode active material 610 (primary particles) can come into contact with each other inside the secondary particles 910 in an appropriate manner. Consequently, lithium ions (Li) can migrate readily between the electrolyte solution and the positive electrode active material 610 (primary particles) and battery resistance of the lithium-ion secondary battery 100 can be kept at a low level.

As described above, according to the lithium-ion secondary battery 100, appropriate numbers of holes (B, C) exist in the positive electrode mixture layer 223. In addition, as described above, the positive electrode active material 610 has appropriate holes both inside B and outside C of the secondary particles 910. Therefore, appropriate amounts of the electrolyte solution penetrate into the positive electrode mixture layer 223 and into the secondary particles 910 of the positive electrode active material 610. As a result, a depletion or a shortage of the electrolyte solution around the positive electrode active material 610 (primary particles) can be prevented in an extremely effective manner. Accordingly, lithium ions (Li) can migrate readily between the electrolyte solution and the positive electrode active material 610 (primary particles). As a result, in particular, high-rate characteristics of the lithium-ion secondary battery 100 can be suitably improved.

<Production Method of Positive Electrode Active Material 610>

Hereinafter, a production method of the positive electrode active material 610 (primary particles) will be described. In the present embodiment, as shown in FIG. 6, the positive electrode active material 610 has secondary particles 910 formed by an aggregation of a plurality of primary particles of a lithium transition metal oxide, a hollow portion 920 formed in the secondary particles 910, and through holes penetrating the secondary particles 910 so as to connect the hollow portion 920 and the outside.

A method of producing the positive electrode active material 610 with the hollow structure described above may include, for example, a raw material hydroxide formation step, a mixing step, and a calcining step.

In this case, the raw material hydroxide formation step is a step of supplying ammonium ions to an aqueous solution of a transition metal compound and precipitating particles of a transition metal hydroxide from the aqueous solution. The aqueous solution favorably contains at least one transition metal element that composes the lithium transition metal oxide. In addition, the raw material hydroxide formation step favorably includes: a nucleation stage in which a transition metal hydroxide is precipitated from the aqueous solution at pH 12 or higher and at an ammonium ion concentration of 25 g/L or lower, and a particle growth stage in which the precipitated transition metal hydroxide is grown at a pH of less than 12 and at an ammonium ion concentration of 3 g/L or higher.

Furthermore, the mixing step is a step of mixing particles of the transition metal hydroxide obtained in the raw material hydroxide formation step with a lithium compound to prepare an unfired mixture. Moreover, the calcining step is a step of calcining the mixture obtained in the mixing step to obtain active material particles. According to this production method, the positive electrode active material 610 having a holed hollow structure can be suitably produced.

In addition, in this case, the calcining step may be carried out such that a maximum calcining temperature is 800° C. to 1100° C. As a result, since the primary particles can be adequately sintered, active material particles having a desired average hardness can be suitably produced. This calcining step is favorably carried out so that, for example, secondary particles are formed in which gaps are substantially not present at the grain boundaries of the primary particles at portions other than the hollow portion 920 and the through holes 930.

Furthermore, the calcining step may include: a first calcining stage in which the mixture is fired at a temperature T1 of 700° C. or higher and 900° C. or lower; and a second calcining stage in which the result of the first calcining stage is fired at a temperature T2 of 800° C. or higher and 1100° C. or lower which is higher than the calcining temperature T1 of the first calcining stage.

In a preferable aspect of an active material particle production method disclosed herein, the calcining step includes a first calcining stage and a second calcining stage. In the first calcining stage, a mixture is fired at a temperature T1 ranging from 700° C. or higher and 900° C. or lower. In the second calcining stage, a result of the first calcining stage is fired at a temperature T2 which ranges from 800° C. or higher and 1100° C. or lower and which is higher than the calcining temperature T1 of the first calcining stage. As a result of calcining the mixture in an aspect that includes these first and second calcining stages, active material particles having the favorable holed hollow structure disclosed herein can be suitably produced.

In addition, a preferable example of the positive electrode active material 610 has a BET specific surface area of approximately 0.5 $m^2$/g or more and 1.9 $m^2$/g or less. Active material particles which have a hollow shape including through holes (holed hollow structure) and which satisfies the BET specific surface area described above are capable of producing high performance in a stable manner when used in a positive electrode of a lithium-ion secondary battery. For example, a lithium secondary battery can be constructed which has low internal resistance (or, in other words, favorable output characteristics) and which demonstrates little increase in resistance attributable to charge-discharge cycling (particularly, charge-discharge cycling that includes high-rate discharge). If the BET specific surface area of the positive electrode active material 610 is excessively small, effects of improving battery performance (for example, the effect of reducing internal resistance) tend to decline. On the other hand, if the BET specific surface area is excessively large, the effect of inhibiting deterioration attributable to charge-discharge cycling tends to decline. Moreover, as a value of the specific surface area, a measurement value by a general nitrogen adsorption method can be adopted.

In addition, an average particle diameter of the secondary particles 910 of the positive electrode active material 610 is favorably approximately 2 μm or more (for example, approximately 2 μm to 25 μm). When the average particle diameter is excessively small, a small inner volume of the hollow portion 920 tends to diminish an effect of improving battery performance. On the other hand, attempting to secure the inner volume of the hollow portion 920 may result in a thinner outer shell of the secondary particles 910 and a reduced strength of the secondary particles 910. Therefore, the average particle diameter of the secondary particles 910 is more favorably approximately 3 μm or more. In addition, from the perspective of productivity and the like of the positive electrode active material 610, the average particle diameter of the secondary particles 910 is favorably approximately 25 μm or less. For example, the average particle diameter of the secondary particles 910 is more favorably approximately 15 μm or less (for example, approximately 10 μm or less). In a favorable aspect, the average particle diameter of the secondary particles 910 is approximately 3 μm to 10 μm. Moreover, as a value of the average particle diameter of the secondary particles 910, a measurement value (D50) obtained by general laser diffractive particle size distribution measurement can be adopted.

In addition, the positive electrode active material 610 with the hollow structure described above may be a lithium transition metal oxide which has a layered structure and which contains nickel as a constituent element. Alternatively, the positive electrode active material 610 with the hollow structure may be a lithium transition metal oxide which has a layered structure and which contains nickel, cobalt, and manganese as constituent elements.

Furthermore, preferably, the through hole 930 of the positive electrode active material 610 is formed in a size which allows the electrolyte solution to more reliably penetrate into the hollow portion 920. Therefore, for example, an average opening width k of the through hole 930 is favorably 0.01 μm or more. Accordingly, the electrolyte solution can more readily penetrate into the hollow portion 920. Here, the opening width k of the through hole 930 refers to a length extending across a narrowest portion of the through hole 930 (an inner diameter of the through hole 930) among a path extending to the hollow portion 920 from the outside of the active material particles through the secondary particles. Moreover, when there are a plurality of through holes 930 in the hollow portion 920, an evaluation may be performed with the through hole 930 having the greatest opening width k among the plurality of through holes 930. In addition, the average opening width k of the through hole 930 may be 2.0 μm or less.

In addition, as for the number of the through holes 930, one or a plurality of (for example, around 20) through holes 930 may exist per one particle of the hollow-structure positive electrode active material 610. Moreover, the number of through holes 930 in the hollow-structure positive electrode active material 610 may be obtained by, for example, ascertaining the number of through holes per particle for at least 10 or more arbitrarily selected active material particles and then calculating an arithmetic average thereof.

<Evaluation Test>

Using positive electrode mixture layers 223 which differ from one another in porosity (Vbc/Va) and in-particle/out-of-particle porosity ratio (Vb/Vc), the present inventors prepared a plurality of evaluation test batteries 800 for each positive electrode mixture layer 223. Subsequently, predetermined tests were performed to study high-rate output characteristics and cycle characteristics. Accordingly, effects of the porosity (Vbc/Va) and the in-particle/out-of-particle porosity ratio (Vb/Vc) described above on the high-rate output characteristics and the cycle characteristics of the lithium-ion secondary battery 100 were assessed.

For the evaluation test, active material particles having a composition represented by $Li_{1.15}Ni_{0.33}Cu_{0.34}Mn_{0.33}O_2$ were used as the positive electrode active material 610. However, by elaborating a generation process of the active material particles, secondary particles of the active material particles were given a hollow structure as shown in FIG. 6.

In this case, positive electrode active materials were varied to produce a plurality of samples of evaluation test lithium-ion secondary batteries. In addition, a plurality of batteries was created for each sample to be used in various tests. The results of the evaluation test are shown in Table 1.

TABLE 1

| Sample | Ratio (Vb/Vc) In-particle/ out-of-particle porosity ratio | Ratio (Vbc/Va) Porosity | 50 C discharge 10-second resistance (mΩ) | 20 C discharge cycle resistance increase rate (—) |
|---|---|---|---|---|
| 1 | 0.057 | 0.41 | 71 | 1.32 |
| 2 | 0.073 | 0.36 | 69 | 1.28 |
| 3 | 0.106 | 0.36 | 68 | 1.25 |
| 4 | 0.123 | 0.46 | 61 | 1.39 |
| 5 | 0.160 | 0.41 | 67 | 1.25 |
| 6 | 0.213 | 0.36 | 65 | 1.21 |
| 7 | 0.363 | 0.41 | 62 | 1.19 |
| 8 | 0.294 | 0.31 | 63 | 1.2 |
| 9 | 0.471 | 0.52 | 60 | 1.32 |
| 10 | 0.511 | 0.36 | 62 | 1.19 |
| 11 | 0.553 | 0.56 | 59 | 1.37 |
| 12 | 0.670 | 0.46 | 60 | 1.28 |
| 13 | 1.019 | 0.41 | 64 | 1.17 |
| 14 | 1.277 | 0.46 | 65 | 1.15 |
| 15 | 1.804 | 0.52 | 57 | 1.14 |
| 16 | 1.901 | 0.36 | 61 | 1.12 |
| 17 | 0.012 | 0.46 | 156 | 3.71 |
| 18 | 0.026 | 0.31 | 119 | 2.85 |
| 19 | 0.028 | 0.56 | 210 | 4.14 |
| 20 | 0.031 | 0.41 | 133 | 3.01 |
| 21 | 0.045 | 0.46 | 148 | 3.32 |

<Evaluation Test Battery>

Figure 7:
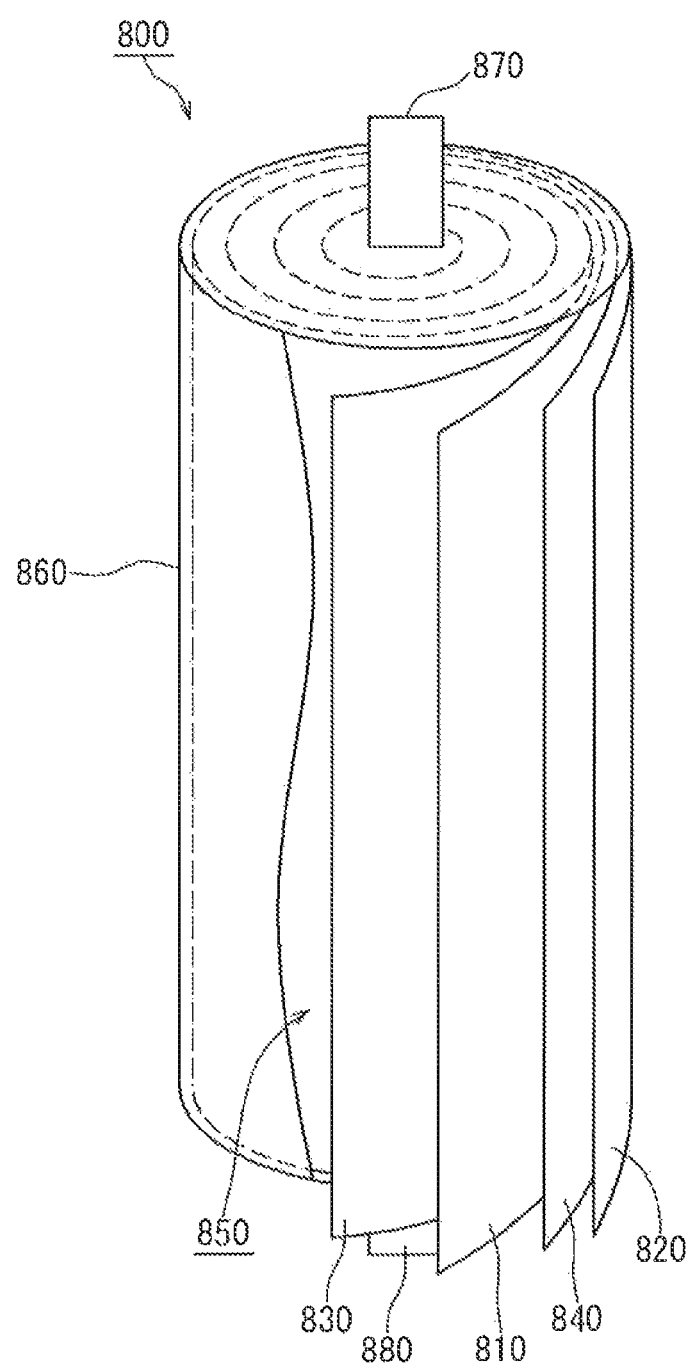
FIG. 7 is a schematic view of an 18650 cell used in an evaluation test.

FIG. 7 schematically shows an evaluation test battery 800. As shown in FIG. 7, the created evaluation test battery 800 is a cylindrical lithium-ion secondary battery commonly referred to as a 18650 cell. In this case, a rating capacity of the evaluation test battery 800 was set to approximately 220 mAh.

For the evaluation test battery 800, as shown in FIG. 7, a positive electrode sheet 810, a negative electrode sheet 820, and two separators 830 and 840 were laminated, and the laminated sheet was wound to fabricate a wound electrode body 850 in which the separators 830 and 840 were interposed between the positive electrode sheet 810 and the negative electrode sheet 820.

In this case, cross-sectional structures of the positive electrode sheet 810 and the negative electrode sheet 820 of the evaluation test battery 800 were approximately similar to the cross-sectional structures of the positive electrode sheet 220 or the negative electrode sheet 240 of the lithium-ion secondary battery 100 (refer to FIG. 1) described earlier. In addition, a porous polyethylene sheet with a thickness of 20 μm was used as the separators 830 and 840. This wound electrode body 850 was housed in an outer case 860 together with a non-aqueous electrolyte solution (not shown) to construct the evaluation test battery 800 (an evaluation test 18650 lithium-ion battery).

Furthermore, with the positive electrode sheet 810, the samples 1 to 21 described above were used as the positive electrode active material 610. In addition, for the evaluation test, acetylene black (AB) was used as the electrically conductive material 620. Furthermore, for the evaluation test, N-methyl-2-pyrrolidone (NMP) was used as a solvent. Moreover, polyvinylidene fluoride (PVDF) was used as the binder 630.

In addition, as shown in FIG. 7, the outer case 860 had an approximately cylindrical shape, and electrode terminals 870 and 880 internally connected to the positive electrode sheet 810 and the negative electrode sheet 820 were provided at both side ends of the cylindrical shape. Moreover, as a non-aqueous electrolyte solution for the evaluation test battery 800, a non-aqueous electrolyte solution was used which had a composition obtained by dissolving $LiPF_6$ in a mixed solvent containing EC, DMC and EMC at a volume ratio of 3:3:4 to a concentration of 1 mol/L.

For the evaluation test, conditions other than the porosity (Vbc/Va) and the in-particle/out-of-particle porosity ratio (Vb/Vc) of the positive electrode mixture layer 223 were set approximately the same. For example, an aluminum foil with a thickness of 15 μm was used as the positive electrode current collector. Furthermore, the amount of coating by the positive electrode mixture on the positive electrode current collector 221 was set to approximately 15 mg/cm².

<Porosity (Vbc/Va)>

The porosity (Vbc/Va) of the positive electrode mixture layer 223 represents a proportion of the holes (B, C) in the positive electrode mixture layer 223. Porosity (Vbc/Va) can be obtained as porosity (Vbc/Va)=(inner volume Vbc of holes (B, C)/(apparent volume Va of positive electrode mixture layer including holes). In Table 1, for a measurement method of porosity (Vbc/Va), as described above, porosity (Vbc/Va) was obtained based on measurement values of respective components measured before creating the positive electrode sheet 810.

<In-Particle/Out-of-Particle Porosity Ratio (Vb/Vc)>

In this case, for the ratio (Vb/Vc) of the positive electrode mixture layer 223 (in-particle/out-of-particle porosity ratio), a cross-sectional SEM image was obtained with respect to the positive electrode sheet 810 used in the evaluation test batteries 800. A ratio (Sb/Sc) between the surface area Sb occupied by the holes B inside the secondary particles 910 and the surface area Sc occupied by the holes C outside the secondary particles 910 of the positive electrode active material 610 was obtained from the cross-sectional SEM image. In Table 1, the ratio (Vb/Vc) of the positive electrode mixture layer 223 (in-particle/out-of-particle porosity ratio) of the evaluation test batteries 800 was approximated by the ratio (Sb/Sc).

<Conditioning>

Next, a conditioning process, a measurement of rated capacity, and SOC adjustment for the evaluation test batteries constructed as described above will be described in order.

The conditioning process is performed according to procedures 1 and 2 below.

Procedure 1: After reaching 4.1 V by charging at a constant current of 1 C, pause for 5 minutes.
Procedure 2: After Procedure 1, charge at a constant voltage for 1.5 hours and subsequently pause for 5 minutes.

<Measurement of Rated Capacity>

Next, rated capacity of the evaluation test batteries is measured according to procedures 1 to 3 below after the conditioning process described above at a temperature of 25° C. and within a voltage range of 3.0 V to 4.1 V.

Procedure 1: After reaching 3.0 V by discharging at a constant current of 1 C, discharge at a constant voltage for 2 hours and subsequently pause for 10 seconds.
Procedure 2: After reaching 4.1 V by charging at a constant current of 1 C, charge at a constant voltage for 2.5 hours and subsequently pause for 10 seconds.

Procedure 3: After reaching 3.0 V by discharging at a constant current of 0.5 C, discharge at a constant voltage for 2 hours and subsequently pause for 10 seconds.

Rated capacity: A discharge capacity (CCCV discharge capacity) of discharging from the constant current discharge to the constant voltage discharge in Procedure 3 is adopted as the rated capacity.

<SOC Adjustment>

SOC adjustment is performed on the evaluation test batteries prepared as described above according to procedures 1 and 2 below under a temperature environment of 25° C. In this case, SOC adjustment may be performed after the conditioning process and the rated capacity measurement described above.

Procedure 1: Charge at a constant current of 1 C from 3V to reach a charged state equivalent to approximately 60% of the rated capacity (SOC 60%). Here, "SOC" refers to State of Charge.

Procedure 2: After Procedure 1, charge at a constant voltage for 2.5 hours.

Accordingly, the evaluation test batteries 800 can be adjusted to a predetermined charged state.

Next, measurement methods of "normal-temperature 50 C discharge 10-second resistance measurement" and "high-rate cycle characteristics (20 C discharge cycle resistance increase)" will be described in sequence.

<High-Rate Characteristics (50 C Discharge 10-Second Resistance)>

High-rate characteristics (50 C discharge 10-second resistance) are obtained by the following procedures. Moreover, in the present embodiment, the measurement temperature environment was set to normal temperature (in this case, 25° C.).

Procedure 1: As SOC adjustment, charge at a constant current of 1 C until SOC 60% is reached, charge at a constant voltage at the SOC 60% for 2.5 hours, and subsequently pause for 10 seconds.

Procedure 2: After Procedure 1, discharge at a constant current of 50 C (in this case, 11 A), and calculate IV resistance from voltage after lapse of 10 seconds.

<High-Rate Cycle Characteristics Evaluation (20 C Discharge Cycle Resistance Increase)>

Figure 8:
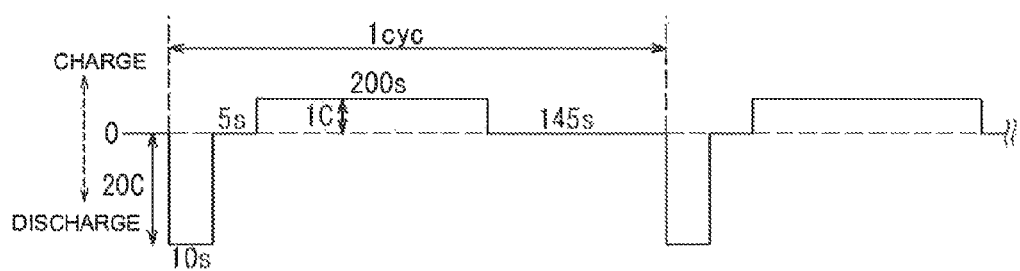
FIG. 8 is a diagram showing a charge-discharge cycle in a high-rate cycle characteristics evaluation test.

In high-rate cycle characteristics evaluation (20 C discharge cycle resistance increase), after an adjustment is made to a charged state of SOC 60% in a temperature environment of −15° C. by the SOC adjustment described above, charge-discharge cycles in which (I) to (V) below constitute one cycle is repeated 2500 times. The "20 C discharge cycle resistance increase rate" in Table 1 represents a rate of increase of resistance of the discharge of (I) in the 2500th cycle. Here, FIG. 8 shows a charge-discharge cycle in this characteristic evaluation test. Moreover, this evaluation test is performed using a different evaluation test battery 800 to that used in the "high rate characteristics (50 C discharge 10-second resistance)" evaluation test.

Hereinafter, one charge-discharge cycle constituted by (I) to (V) will be described.

(I) Discharge for 10 seconds at a constant current of 20 C (here, 4.4 A).

(II) Pause for 5 seconds.

(III) Charge for 200 seconds at a constant current of 1 C.

(IV) Pause for 145 seconds.

(V) Measure the rate of increase of resistance during the discharging of (I) for each cycle.

However, the SOC adjustment described above is performed once every 100 repetitions of the charge-discharge cycle constituted by (I) to (V).

The "high-rate cycle characteristics (20 C discharge cycle resistance increase)" in Table 1 represents a rate of increase of resistance of the discharge of (I) in the 2500th cycle.

In addition, although not listed in Table 1, various other tests were performed on the evaluation test batteries 800. As such other tests, "reaction resistance measurement (alternating current impedance measurement method)" and "high-temperature cycle test" will be described below.

<Reaction Resistance Measurement (Alternating Current Impedance Measurement Method)>

Figure 9:
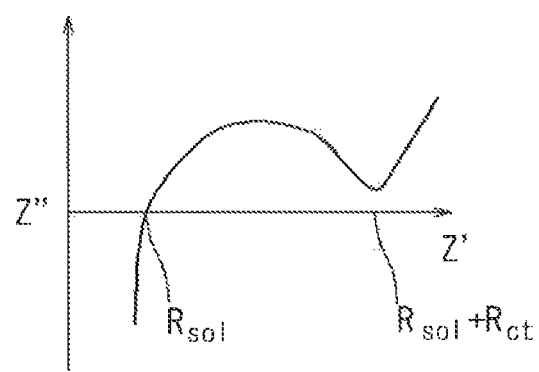
FIG. 9 is a diagram showing fitting of data to an equivalent circuit of a Nyquist plot during a reaction resistance measurement.

Reaction resistance is measured according to an alternating current impedance measurement method. FIG. 9 is a diagram showing fitting of data to an equivalent circuit of a Nyquist plot during reaction resistance measurement. In the present embodiment, measurements were performed under two measurement conditions, namely, at 25 degrees and SOC 60% (a charged state equivalent to approximately 60% of rated capacity) and at −30 degrees and SOC 40% (a charged state equivalent to approximately 40% of rated capacity). For the measurements, complex impedance measurements were performed in a frequency range of $10^{-3}$ to $10^4$ Hz. Subsequently, as shown in FIG. 9, a direct current resistance ($R_{sol}$) and a reaction resistance ($R_{ct}$) are calculated by fitting data to an equivalent circuit of a Nyquist plot. In this case, the reaction resistance ($R_{ct}$) can be obtained according to the following equation.

$$R_{ct} = (R_{ct} + R_{sol}) - R_{sol}$$

<High-Temperature Cycle Test>

In the "high-temperature cycle test", for different evaluation test batteries 800, an alternating-current impedance measurement method is performed at 25° C. to calculate a direct current resistance ($R_{sol}$) and a reaction resistance ($R_{ct}$). In this case, the alternating-current impedance measurement method conforms to the method described in "Low-temperature reaction resistance". Subsequently, a charge-discharge cycle constituted by (I) and (II) below is repeated 1000 times at a temperature of 60° C. and in a voltage range of 3.0 V to 4.1 V. Accordingly, cycle characteristics of batteries in a high-temperature environment can be evaluated.

(I) Reach 3 V by discharging at 2 C at a constant voltage.

(II) Reach 4.1 V by charging at 2 C at a constant voltage.

When used as a vehicle drive power source, the lithium-ion secondary battery 100 is required to produce particularly high output upon startup and acceleration. In addition, there are demands for quick charging in order to reduce the time required for charging. Furthermore, the lithium-ion secondary battery 100 is expected to be applicable over a wide temperature environment range. For example, the lithium-ion secondary battery 100 is expected to be applicable to a temperature environment of −30° C. to 60° C. Durability with respect to vibration and shock is also required.

In this case, as shown in FIG. 6, the positive electrode active material 610 used in the positive electrode mixture layer 223 of the lithium-ion secondary battery 100 has secondary particles 910 formed by an aggregation of a plurality of primary particles of a lithium transition metal oxide, a hollow portion 920 formed in the secondary particles 910, and through holes 930 penetrating the secondary particles 910 so as to connect the hollow portion 920 and the outside.

In other words, with the secondary particles 910 described above, an electrolyte solution can penetrate into the hollow portion 920 through the through holes 930. Therefore, the primary particles 900 are able to come into contact with the electrolyte solution even inside the secondary particles 910. In addition, lithium ions (Li) can migrate readily between the electrolyte solution and the primary particles 900. However, when appropriate holes C are not provided in the positive electrode mixture layer 223 outside the secondary particles 910, the electrolyte solution may not always reach the inside of the positive electrode active material 610. Furthermore, even if appropriate out-of-particle holes C are provided outside the secondary particles 910, the primary particles 900 cannot be efficiently utilized inside the secondary particles 910 if appropriate in-particle holes B are not provided inside the secondary particles 910. In consideration of the above, the present inventors reasoned that, desirably, porosity (Vbc/Va) is within an appropriate range and in-particle/out-of-particle porosity ratio (Vb/Vc) is also within an appropriate range.

As described above, the present inventors conducted various tests using evaluation test batteries 800 when the positive electrode active material 610 described above is used. Consequently, findings were made in that the porosity (Vbc/Va) is favorably set to approximately 0.25≤(Vbc/Va) for the purpose of particularly improving high-rate characteristics and cycle characteristics. Furthermore, findings were made in that in-particle/out-of-particle porosity ratio (Vb/Vc) desirably satisfies approximately 0.05≤(Vb/Vc)≤2.5.

For example, with samples 17 to 21 in Table 1, the in-particle/out-of-particle porosity ratio (Vb/Vc) is 0.012 to 0.045 and the in-particle holes B are relatively small with respect to the out-of-particle holes C. In such a case, resistance relatively increases. In contrast, with samples 1 to 16, porosity (Vbc/Va) satisfies 0.25≤(Vbc/Va) and, at the same time, in-particle/out-of-particle porosity ratio (Vb/Vc) satisfies 0.05≤(Vb/Vc)≤2.5. As described above, having porosity (Vbc/Va) and in-particle/out-of-particle porosity ratio (Vb/Vc) in respectively appropriate ranges is conceivably a condition for obtaining a secondary battery with preferable so-called high-rate characteristics and cycle characteristics. The porosity (Vbc/Va) may more favorably satisfy 0.30≤(Vbc/Va). When the porosity of the positive electrode mixture layer 223 increases, a depletion of the electrolyte solution is less likely to occur and lithium ions (Li ions) can migrate more easily between the positive electrode active material 610 and the electrolyte solution.

Figure 10:
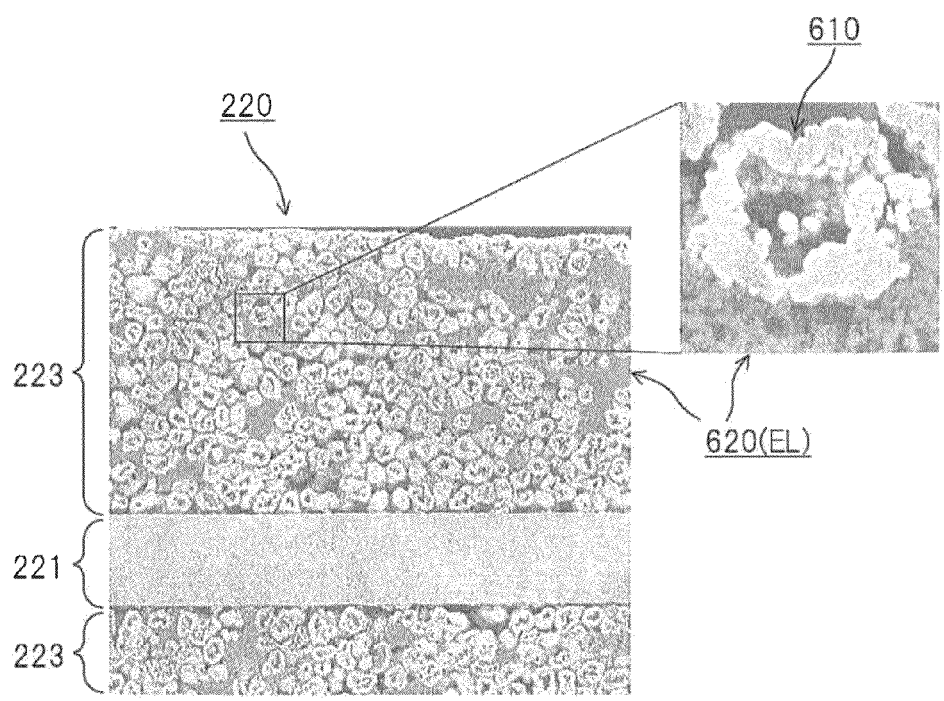
FIG. 10 shows an example of a cross-sectional SEM image of a positive electrode sheet.

As shown, there is a tendency that the higher the porosity X of the positive electrode mixture layer 223, the more favorable. Therefore, although an upper limit of the porosity (Vbc/Va) is not particularly set, the porosity (Vbc/Va) may have an appropriate and feasible magnitude. Therefore, the porosity (Vbc/Va) may have an appropriate and feasible magnitude and, for example, may be around 0.65. Moreover, while the porosity (Vbc/Va) may be greater than 65(%), an excessively high porosity (Vbc/Va) may prevent an electron pathway between the positive electrode active material 610 and the electrically conductive material 620 from being constructed and may result in a deterioration in collecting capability. For example, the porosity (Vbc/Va) may be set to 65% or lower such as at approximately 60% or more favorably at approximately 57(%). Accordingly, since electron pathways can be more reliably constructed between the positive electrode active material 610 and the electrically conductive material 620, a secondary battery with more stable performance can conceivably be obtained. FIG. 10 shows an example of a cross-sectional SEM image of the positive electrode mixture layer 223. For example, the electrically conductive material 620 is densely aggregated between particles of the positive electrode active material 610 as depicted in a portion denoted as EL in FIG. 10.

In addition, conceivably, the smaller the amount of holes C formed outside the secondary particles 910, the higher the density of the electrically conductive material 620 in the positive electrode mixture layer 223. Therefore, conceivably, collecting capability of the positive electrode mixture layer 223 improves and so-called high-rate characteristics or cycle characteristics can be further improved. Consequently, the in-particle/out-of-particle porosity ratio (Vb/Vc) favorably satisfies approximately 0.07<(Vb/Vc), more favorably satisfies approximately 0.2<(Vb/Vc), and even more favorably satisfies 0.5<(Vb/Vc). Furthermore, the in-particle/out-of-particle porosity ratio (Vb/Vc) may alternatively satisfy approximately 1.0<(VbN/Vc).

On the other hand, an excessively high in-particle/out-of-particle porosity ratio (Vb/Vc) reduces coated film density of the positive electrode mixture layer 223 and, for example, causes the positive electrode sheet 810 to bend significantly during the rolling step. Therefore, the in-particle/out-of-particle porosity ratio (Vb/Vc) more favorably satisfies approximately (Vb/Vc)<2.0 and even more favorably satisfies approximately (Vb/Vc)<1.95. Accordingly, bending of the positive electrode sheet 810 during the rolling step can be kept to a lower level.

Figure 11:
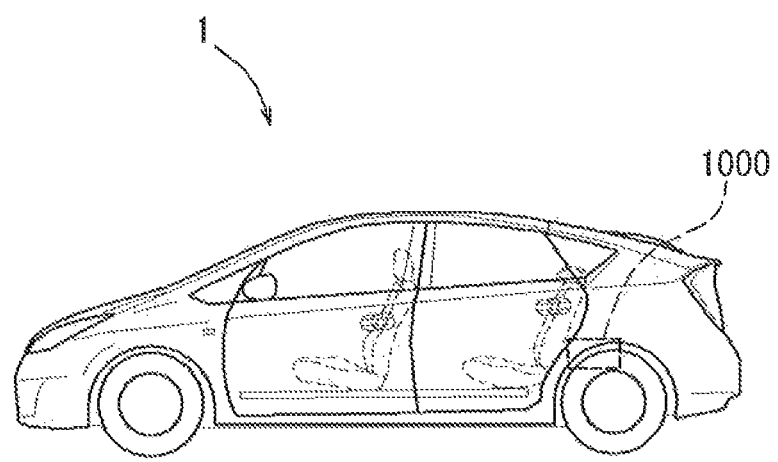
FIG. 11 is a diagram showing an example of a vehicle mounted with a vehicle drive battery.

Furthermore, the present invention can contribute to improving the output of a secondary battery. Therefore, the structure according to the present invention is preferable for use in a secondary battery used as a vehicle drive power supply such as a drive battery of a hybrid vehicle or an electrical vehicle which is required to have superior high-rate output characteristics and high-rate cycling characteristics. In this case, for example, as shown in FIG. 11, the secondary battery can be preferably used as a vehicle drive battery 1000 for driving a motor of a vehicle 1 such as an automobile in the form of an assembled battery in which a plurality of the secondary batteries are connected in series.

In other words, as shown in FIG. 6, with the vehicle drive battery 1000, the positive electrode active material 610 used in the positive electrode mixture layer 223 favorably has the secondary particles 910, the hollow portion 920, and the through hole 930 described above. In addition, favorably, the porosity (Vbc/Va) of the positive electrode mixture layer 223 satisfies 0.25≤(Vbc/Va) and the in-particle/out-of-particle porosity ratio (Vb/Vc) of the positive electrode mixture layer 223 satisfies 0.05≤(Vb/Vc)≤2.5. Various modifications may be made to shapes of the battery or detailed structures of the battery. In addition, the vehicle drive battery 1000 may be configured as an assembled battery which combines a plurality of secondary batteries.

As described above, the present invention proposes a structure of a positive electrode mixture layer capable of improving output of a secondary battery comprising a positive electrode in which a current collector is coated by the positive electrode mixture layer. In addition, it is to be understood that the present invention is not limited to any of the embodiments described above. For example, while a lithium-ion secondary battery has been appropriately exemplified as an embodiment of the present invention, the present invention is not limited to lithium-ion secondary batteries unless otherwise stated. Unless otherwise stated, a secondary battery according to the present invention can be adopted in a structure of a positive electrode mixture layer of a secondary battery other than a lithium-ion secondary battery.

REFERENCE SINGS LIST 100 lithium-ion secondary battery (secondary battery)
200 wound electrode body
220 positive electrode sheet
221 positive electrode current collector
222 uncoated portion
222a intermediate portion 223 positive electrode mixture layer
224 positive electrode mixture
240 negative electrode sheet
241 negative electrode current collector
242 uncoated portion
243 negative electrode mixture layer
244 negative electrode mixture
245 heat-resistant layer
262 separator
264 separator
300 battery case
310, 312 gap
320 container main body
322 joint of lid and container main body
340 lid
360 safety valve
420 electrode terminal (positive electrode)
440 electrode terminal (negative electrode)
610 positive electrode active material
620 electrically conductive material
630 binder
800 evaluation test battery
810 positive electrode sheet
820 negative electrode sheet
830, 840 separator
850 wound electrode body
860 outer case
870 electrode terminal
900 primary particles
910 secondary particles
920 hollow portion
930 through holes
1000 vehicle drive battery

The invention claimed is:

1. A secondary battery comprising:
a current collector; and
a positive electrode mixture layer which is coated over the current collector, wherein
the positive electrode mixture layer includes a positive electrode active material, an electrically conductive material, and a binder,
the positive electrode active material has:
secondary particles formed by an aggregation of a plurality of primary particles of a lithium transition metal oxide;
a hollow portion formed in the secondary particle; and
through holes penetrating the secondary particles so as to connect the hollow portion and the outside,
a ratio $V_{bc}/V_a$ of an inner volume $V_{bc}$ of holes formed inside the positive electrode mixture layer to an apparent volume $V_a$ of the positive electrode mixture layer satisfies $0.25 \leq V_{bc}/V_a$, and
in a section of the positive electrode mixture layer, a ratio $V_b/V_c$ of an inner Volume $V_b$ of holes B formed inside the positive electrode active material to an inner volume $V_c$ of holes C formed outside the positive electrode active material satisfies $0.05 \leq V_b/V_c \leq 2.5$, wherein the inner volume $V_b$ of holes B is an inner volume of the hollow portion that connects to the outside by the through holes,
the secondary battery is a lithium-ion secondary battery which uses lithium ions as electrolyte ions and in which charging and discharging are realized by the movement of electrons accompanying lithium ions between a positive electrode and a negative electrode.

2. The secondary battery according to claim 1, wherein the ratio $V_{bc}/V_a$ satisfies $0.30 \leq V_{bc}/V_a$.

3. The secondary battery according to claim 1, wherein the ratio $V_{bc}/V_a$ satisfies $V_{bc}/V_a \leq 0.60$.

4. The secondary battery according to claim 1, wherein the ratio $V_b/V_c$ satisfies $0.07 \leq V_b/V_c$.

5. The secondary battery according to claim 1, wherein the ratio $V_b/V_c$ satisfies $V_b/V_c \leq 1.95$.

6. The secondary battery according to claim 1, wherein
the positive electrode active material is a positive electrode active material produced by a production method including:
a raw material hydroxide formation step of supplying ammonium ions to an aqueous solution of a transition metal compound, and precipitating particles of the transition metal hydroxide from the aqueous solution, this aqueous solution containing at least one transition metal element that composes the lithium transition metal oxide;
a mixing step of mixing the transition metal hydroxide with a lithium compound to prepare an unfired mixture; and
a calcining step of calcining the mixture to obtain the active material particles, and wherein
the raw material hydroxide formation step includes a nucleation stage in which the transition metal hydroxide is precipitated from the aqueous solution at pH 12 or higher and at an ammonium ion concentration of 25 g/L or less and a particle growth stage in which the transition metal hydroxide precipitated in the nucleation stage is grown at a pH of less than 12 and at an ammonium ion concentration of 3 g/L or more.

7. The secondary battery according to claim 6, wherein the calcining step is carried out such that a maximum calcining temperature is 800° C. to 1100° C.

8. The secondary battery according to claim 6, wherein the calcining step includes a first calcining stage in which the mixture is fired at a temperature T1 of 700° C. to 900° C., and a second calcining stage in which the result of the first calcining stage is fired at a temperature T2 of 800° C. to 1100° C. that is higher than the calcining temperature T1 of the first calcining stage.

9. The secondary battery according to claim 1, wherein a BET specific surface area of the positive electrode active material is 0.5 m$^2$/g or more and 1.9 m$^2$/g or less.

10. The secondary battery according to claim 1, wherein the positive electrode active material has an average particle diameter of 3 μm to 10 μm.

11. The secondary battery according to claim 1, wherein the positive electrode active material is a lithium transition metal oxide which has a layered structure and which contains nickel as a constituent element thereof.

12. The secondary battery according to claim 1, wherein the positive electrode active material is a lithium transition metal oxide which has a layered structure and which contains nickel, cobalt, and manganese as constituent elements thereof.

13. A vehicle drive battery constituted by the secondary battery according to claim 1.

* * * * *